US012713485B2

(12) United States Patent
Faccin et al.

(10) Patent No.: US 12,713,485 B2
(45) **Date of Patent: *Aug. 18, 2026**

(54) HANDLING SLICE LIMITATIONS

(71) Applicant: QUALCOMM Incorporated, San Diego, CA (US)

(72) Inventors: Stefano Faccin, San Ysidro, CA (US); Mahmoud Watfa, St-Leonard (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,090

(22) Filed: Mar. 4, 2024

(65) Prior Publication Data

US 2024/0284537 A1 Aug. 22, 2024

Related U.S. Application Data

(63) Continuation of application No. 17/090,551, filed on Nov. 5, 2020, now Pat. No. 11,963,247.
(Continued)

(51) Int. Cl.
*H04W 48/18* (2009.01)
*H04W 60/00* (2009.01)
(Continued)

(52) U.S. Cl.
CPC ........... *H04W 76/18* (2018.02); *H04W 48/18* (2013.01); *H04W 60/00* (2013.01); *H04W 76/12* (2018.02)

(58) Field of Classification Search
CPC ..... H04W 76/18; H04W 48/18; H04W 76/12; H04W 48/02; H04W 60/00
See application file for complete search history.

(56) References Cited

U.S. PATENT DOCUMENTS 11,963,247 B2 * 4/2024 Faccin .................. H04W 76/18
2018/0132096 A1 * 5/2018 Huo ........................ H04W 8/08
(Continued)

FOREIGN PATENT DOCUMENTS

EP 3471464 A1 4/2019
WO WO-2020168310 A1 8/2020

OTHER PUBLICATIONS

3GPP TS 24.501: "3rd Generation Partnership Project; Technical Specification Group Core Network and Terminals, Non-Access-Stratum (NAS) protocol for 5G System (5GS), Stage 3 (Release 15)", 3GPP Standard, Technical Specification, 3GPP TS 24.501, 3rd Generation Partnership Project (3GPP), Mobile Competence Centre, 650, Route Des Lucioles, F-06921, Sophia-antipolis Cedex ; France, vol. CT WG1, No. V15.5.0, Sep. 24, 2019, pp. 1-480, XP051784712.
(Continued)

*Primary Examiner* — Marcus Hammonds
(74) *Attorney, Agent, or Firm* — Holland & Hart LLP

(57) ABSTRACT

Methods, systems, and devices for wireless communications are described. Generally, the described techniques at a network provide for efficiently considering parameters of a network slice when determining whether to provide access to the network slice, allow the establishment of a session via the network slice, or grant access to resources for communications via the network slice. Further, the described techniques at a user equipment (UE) provide for efficiently determining when or whether to retry to access a network slice, retry to establish a session via the network slice, or retry to access resources for communicating via the network slice.

20 Claims, 24 Drawing Sheets

Related U.S. Application Data

(60) Provisional application No. 62/932,340, filed on Nov. 7, 2019.

(51) Int. Cl.
*H04W 76/12* (2018.01)
*H04W 76/18* (2018.01)

(56) References Cited

U.S. PATENT DOCUMENTS

2018/0317163 A1 11/2018 Lee et al.
2018/0324577 A1 11/2018 Faccin et al.
2019/0029065 A1* 1/2019 Park .................... H04W 60/00
2019/0174449 A1 6/2019 Shan et al.
2019/0223093 A1 7/2019 Watfa et al.
2019/0246334 A1 8/2019 Wang et al.
2020/0059989 A1* 2/2020 Velev .................... H04W 36/12
2020/0162919 A1 5/2020 Velev et al.
2020/0178196 A1 6/2020 Wang et al.
2020/0205065 A1* 6/2020 Wei .................... H04W 48/18
2020/0322879 A1* 10/2020 Zhu .................... H04W 60/00
2021/0029628 A1* 1/2021 Kim .................... H04W 48/18
2021/0037455 A1* 2/2021 Zhu .................... H04W 76/27
2021/0144790 A1 5/2021 Faccin
2021/0410107 A1* 12/2021 Park .................... H04W 68/02
2022/0124595 A1 4/2022 Xu et al.
2023/0052699 A1* 2/2023 Ninglekhu ............ H04W 60/04
2023/0108950 A1* 4/2023 Centonza ............. H04W 36/14
370/331

OTHER PUBLICATIONS

3GPP TS 24.501: “3rd Generation Partnership Project; Technical Specification Group Core Network and Terminals; Non-Access-Stratum (NAS) Protocol for 5G System (5GS); Stage 3 (Release 15)”, 3GPP Standard; Technical Specification; 3GPP TS 24.501, 3rd Generation Partnership Project (3GPP), Mobile Competence Centre, 650, Route Des Lucioles, F-06921, Sophia-Antipolis Cedex, France, vol. CT WG1, No. V15.5.0 Sep. 24, 2019 (Sep. 24, 2019), pp. 1-480, XP051784712, chapters 6.4.1, 5.5.1.2.

International Preliminary Report on Patentability—PCT/US2020/059313 The International Bureau of WIPO—Geneva, Switzerland, May 19, 2022.

International Search Report and Written Opinion—PCT/US2020/059313—ISA/EPO—Apr. 20, 2021.

Partial International Search Report—PCT/US2020/059313—ISA/EPO—Feb. 26, 2021.

* cited by examiner

1300

1800

HANDLING SLICE LIMITATIONS

CROSS REFERENCE

The present application for patent is a Continuation of U.S. patent application Ser. No. 17/090,551 by FACCIN et al., entitled "HANDLING SLICE LIMITATIONS" filed Nov. 5, 2020, which claims the benefit of U.S. Provisional Patent Application No. 62/932,340 by FACCIN et al., entitled "HANDLING SLICE LIMITATIONS," filed Nov. 7, 2019, each of which are assigned to the assignee hereof, and each of which are expressly incorporated by reference herein.

BACKGROUND

The following relates generally to wireless communications and more specifically to handling slice limitations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications system, a UE may access a network slice for communicating with a base station. Improved techniques for managing communications between a base station and a UE via a network slice may be desirable.

SUMMARY

The described techniques relate to improved methods, systems, devices, and apparatuses that support handling slice limitations. Generally, the described techniques at a network provide for efficiently considering parameters of a network slice when determining whether to provide access to the network slice, allow the establishment of a session via the network slice, or grant access to resources for communications via the network slice. As an example, the network may provide access to a network slice, allow the establishment of a session via the network slice, or grant access to resources for communications via the network slice when one or more criteria associated with parameters of the network slice are satisfied. Further, the described techniques at a user equipment (UE) provide for efficiently determining when or whether to retry to access a network slice, retry to establish a session via the network slice, or retry to access resources for communicating via the network slice. As an example, a UE may retry to access a network slice, retry to establish a session via the network slice, or retry to access resources for communicating via the network slice when one or more conditions provided to the UE for the network slice are satisfied.

A method of wireless communication at a UE is described. The method may include sending, to a network entity, a first request for access to a network slice of a set of network slices, the first request including an identifier of the network slice, receiving, from the network entity, a first control message indicating that access to the network slice is rejected and indicating at least one condition for retrying to access the network slice, and determining whether to send a second request for access to the network slice based on the at least one condition for retrying to access the network slice.

An apparatus for wireless communication at a UE is described. The apparatus may include a processor, memory coupled with the processor, and instructions stored in the memory. The instructions may be executable by the processor to cause the apparatus to send, to a network entity, a first request for access to a network slice of a set of network slices, the first request including an identifier of the network slice, receive, from the network entity, a first control message indicating that access to the network slice is rejected and indicating at least one condition for retrying to access the network slice, and determine whether to send a second request for access to the network slice based on the at least one condition for retrying to access the network slice.

Another apparatus for wireless communication at a UE is described. The apparatus may include means for sending, to a network entity, a first request for access to a network slice of a set of network slices, the first request including an identifier of the network slice, receiving, from the network entity, a first control message indicating that access to the network slice is rejected and indicating at least one condition for retrying to access the network slice, and determining whether to send a second request for access to the network slice based on the at least one condition for retrying to access the network slice.

A non-transitory computer-readable medium storing code for wireless communication at a UE is described. The code may include instructions executable by a processor to send, to a network entity, a first request for access to a network slice of a set of network slices, the first request including an identifier of the network slice, receive, from the network entity, a first control message indicating that access to the network slice is rejected and indicating at least one condition for retrying to access the network slice, and determine whether to send a second request for access to the network slice based on the at least one condition for retrying to access the network slice.

Some examples of the method, apparatuses, and non-transitory computer-readable medium described herein may further include operations, features, means, or instructions for determining that the at least one condition for retrying to access the network slice may be satisfied, sending, to the network entity, the second request for access to the network slice, and receiving, from the network entity, a second control message indicating that access to the network slice may be allowed. In some examples of the method, apparatuses, and non-transitory computer-readable medium described herein, the at least one condition includes whether the UE may be within a geographic coverage area for the network slice. In some examples of the method, apparatuses, and non-transitory computer-readable medium described herein, the at least one condition includes whether a backoff timer associated with the network slice may have expired. In some examples of the method, apparatuses, and non-transitory computer-readable medium described herein, the at least one condition includes whether a session or application type may have changed.

A method of wireless communication at a network entity is described. The method may include receiving, from a UE, a first request for access to a network slice of a set of network slices, the first request including an identifier of the network slice, determining to reject access to the network slice based on one or more parameters associated with the network slice, and sending, to the UE, a first control message indicating that access to the network slice is rejected and indicating at least one condition for retrying to access the network slice.

An apparatus for wireless communication at a network entity is described. The apparatus may include a processor, memory coupled with the processor, and instructions stored in the memory. The instructions may be executable by the processor to cause the apparatus to receive, from a UE, a first request for access to a network slice of a set of network slices, the first request including an identifier of the network slice, determine to reject access to the network slice based on one or more parameters associated with the network slice, and send, to the UE, a first control message indicating that access to the network slice is rejected and indicating at least one condition for retrying to access the network slice.

Another apparatus for wireless communication at a network entity is described. The apparatus may include means for receiving, from a UE, a first request for access to a network slice of a set of network slices, the first request including an identifier of the network slice, determining to reject access to the network slice based on one or more parameters associated with the network slice, and sending, to the UE, a first control message indicating that access to the network slice is rejected and indicating at least one condition for retrying to access the network slice.

A non-transitory computer-readable medium storing code for wireless communication at a network entity is described. The code may include instructions executable by a processor to receive, from a UE, a first request for access to a network slice of a set of network slices, the first request including an identifier of the network slice, determine to reject access to the network slice based on one or more parameters associated with the network slice, and send, to the UE, a first control message indicating that access to the network slice is rejected and indicating at least one condition for retrying to access the network slice.

Some examples of the method, apparatuses, and non-transitory computer-readable medium described herein may further include operations, features, means, or instructions for receiving, from the UE, a second request for access to the network slice based on the at least one condition for retrying to access the network slice, the second request including the identifier of the network slice, determining to allow access to the network slice based on the one or more parameters associated with the network slice, and sending, to the UE, a second control message indicating that access to the network slice may be allowed.

Some examples of the method, apparatuses, and non-transitory computer-readable medium described herein may further include operations, features, means, or instructions for storing at least one criterion used to determine to reject access to the network slice based on the one or more parameters associated with the network slice or based on other parameters associated with the network slice, determining that the at least one criterion used to determine to reject access to the network slice may be invalid, and sending, to the UE, a second control message indicating that access to the network slice may be allowed.

In some examples of the method, apparatuses, and non-transitory computer-readable medium described herein, the at least one condition includes whether the UE may be within a geographic coverage area for the network slice. In some examples of the method, apparatuses, and non-transitory computer-readable medium described herein, the at least one condition includes whether a backoff timer associated with the network slice may have expired. In some examples of the method, apparatuses, and non-transitory computer-readable medium described herein, the at least one condition includes whether a session or application type may have changed. In some examples of the method, apparatuses, and non-transitory computer-readable medium described herein, the one or more parameters include generic network slice template parameters.

A method of wireless communication at a UE is described. The method may include sending, to a first network entity, a request for access to a network slice of a set of network slices, the request including an identifier of the network slice, receiving, from the first network entity, a control message indicating that access to the network slice is allowed, sending, to a second network entity, a first control message to establish a session via the network slice, receiving, from the first network entity or the second network entity, a second control message indicating that the session is rejected, and identifying, in the second control message, at least one condition for retrying to establish the session via the network slice.

An apparatus for wireless communication at a UE is described. The apparatus may include a processor, memory coupled with the processor, and instructions stored in the memory. The instructions may be executable by the processor to cause the apparatus to send, to a first network entity, a request for access to a network slice of a set of network slices, the request including an identifier of the network slice, receive, from the first network entity, a control message indicating that access to the network slice is allowed, send, to a second network entity, a first control message to establish a session via the network slice, receive, from the first network entity or the second network entity, a second control message indicating that the session is rejected, and identify, in the second control message, at least one condition for retrying to establish the session via the network slice.

Another apparatus for wireless communication at a UE is described. The apparatus may include means for sending, to a first network entity, a request for access to a network slice of a set of network slices, the request including an identifier of the network slice, receiving, from the first network entity, a control message indicating that access to the network slice is allowed, sending, to a second network entity, a first control message to establish a session via the network slice, receiving, from the first network entity or the second network entity, a second control message indicating that the session is rejected, and identifying, in the second control message, at least one condition for retrying to establish the session via the network slice.

A non-transitory computer-readable medium storing code for wireless communication at a UE is described. The code may include instructions executable by a processor to send, to a first network entity, a request for access to a network slice of a set of network slices, the request including an identifier of the network slice, receive, from the first network entity, a control message indicating that access to the network slice is allowed, send, to a second network entity, a first control message to establish a session via the network slice, receive, from the first network entity or the second network entity, a second control message indicating that the session is rejected, and identify, in the second control message, at least one condition for retrying to establish the session via the network slice.

Some examples of the method, apparatuses, and non-transitory computer-readable medium described herein may further include operations, features, means, or instructions for determining that the at least one condition for retrying to establish the session via the network slice may be satisfied, sending, to the second network entity, a third control message to establish the session via the network slice, and receiving, from the second network entity, an indication that the session via the network slice may be successfully established. In some examples of the method, apparatuses, and non-transitory computer-readable medium described herein, the at least one condition includes whether the UE may be within a geographic coverage area for the network slice. In some examples of the method, apparatuses, and non-transitory computer-readable medium described herein, the at least one condition includes whether a session or application type may have changed.

In some examples of the method, apparatuses, and non-transitory computer-readable medium described herein, the at least one condition includes whether a session and service continuity (SSC) mode has changed. Some examples of the method, apparatuses, and non-transitory computer-readable medium described herein may further include operations, features, means, or instructions for identifying, in the second control message, a rejection cause for the session being rejected. In some examples of the method, apparatuses, and non-transitory computer-readable medium described herein, the rejection cause indicates that an SSC mode is unsupported. In some examples of the method, apparatuses, and non-transitory computer-readable medium described herein, the first network entity includes an access and mobility management function, and the second network entity includes a session management function.

A method of wireless communication at a network entity is described. The method may include receiving, from a UE, a first control message for establishing a session via a network slice, where access to the network slice is allowed for the UE, determining to reject the session via the network slice based on one or more parameters associated with the network slice, and sending, to the UE, a second control message indicating that the session is rejected and indicating at least one condition for retrying to establish the session via the network slice.

An apparatus for wireless communication at a network entity is described. The apparatus may include a processor, memory coupled with the processor, and instructions stored in the memory. The instructions may be executable by the processor to cause the apparatus to receive, from a UE, a first control message for establishing a session via a network slice, where access to the network slice is allowed for the UE, determine to reject the session via the network slice based on one or more parameters associated with the network slice, and send, to the UE, a second control message indicating that the session is rejected and indicating at least one condition for retrying to establish the session via the network slice.

Another apparatus for wireless communication at a network entity is described. The apparatus may include means for receiving, from a UE, a first control message for establishing a session via a network slice, where access to the network slice is allowed for the UE, determining to reject the session via the network slice based on one or more parameters associated with the network slice, and sending, to the UE, a second control message indicating that the session is rejected and indicating at least one condition for retrying to establish the session via the network slice.

A non-transitory computer-readable medium storing code for wireless communication at a network entity is described. The code may include instructions executable by a processor to receive, from a UE, a first control message for establishing a session via a network slice, where access to the network slice is allowed for the UE, determine to reject the session via the network slice based on one or more parameters associated with the network slice, and send, to the UE, a second control message indicating that the session is rejected and indicating at least one condition for retrying to establish the session via the network slice.

In some examples of the method, apparatuses, and non-transitory computer-readable medium described herein, the network entity may include operations, features, means, or instructions for receiving, from the UE, a request for access to the network slice of a set of network slices, the request including an identifier of the network slice, determining that at least one criterion of the one or more parameters associated with the network slice is not satisfied, sending, to the UE, a third control message indicating that access to the network slice may be allowed, and storing the at least one criterion to use to determine to reject the session via the network slice based on determining that the at least one criterion of the one or more parameters associated with the network slice is not satisfied. In such examples, the network entity includes an access and mobility management function (AMF).

Some examples of the method, apparatuses, and non-transitory computer-readable medium described herein may further include operations, features, means, or instructions for receiving, from the UE, a third control message for establishing the session via the network slice based on the at least one condition for retrying to establish the session via the network slice, determining to allow the session via the network slice based on the one or more parameters associated with the network slice, and sending, to the UE, an indication that the session via the network slice may be successfully established.

In some examples of the method, apparatuses, and non-transitory computer-readable medium described herein, the at least one condition comprises whether the UE is within a geographic coverage area for the network slice. In some examples of the method, apparatuses, and non-transitory computer-readable medium described herein, the at least one condition comprises whether a session or application type has changed. In some examples of the method, apparatuses, and non-transitory computer-readable medium described herein, the at least one condition comprises whether an SSC mode has changed. Some examples of the method, apparatuses, and non-transitory computer-readable medium described herein may further include operations, features, means, or instructions for sending, in the second control message, a rejection cause for the session being rejected. In some examples of the method, apparatuses, and non-transitory computer-readable medium described herein, the rejection cause indicates that an SSC mode is unsupported.

A method of wireless communication at a UE is described. The method may include sending, to a network entity, a request for access to a network slice of a set of network slices, the request including an identifier of the network slice, receiving, from the network entity, a first control message indicating that access to the network slice is allowed, establishing a session via the network slice for communicating with a base station, sending, to the base station, a request for resources for communicating with the base station via the session, and receiving, from the base station, a second control message indicating that access to the resources is rejected.

An apparatus for wireless communication at a UE is described. The apparatus may include a processor, memory coupled with the processor, and instructions stored in the memory. The instructions may be executable by the processor to cause the apparatus to send, to a network entity, a request for access to a network slice of a set of network slices, the request including an identifier of the network slice, receive, from the network entity, a first control message indicating that access to the network slice is allowed, establish a session via the network slice for communicating with a base station, send, to the base station, a request for resources for communicating with the base station via the session, and receive, from the base station, a second control message indicating that access to the resources is rejected.

Another apparatus for wireless communication at a UE is described. The apparatus may include means for sending, to a network entity, a request for access to a network slice of a set of network slices, the request including an identifier of the network slice, receiving, from the network entity, a first control message indicating that access to the network slice is allowed, establishing a session via the network slice for communicating with a base station, sending, to the base station, a request for resources for communicating with the base station via the session, and receiving, from the base station, a second control message indicating that access to the resources is rejected.

A non-transitory computer-readable medium storing code for wireless communication at a UE is described. The code may include instructions executable by a processor to send, to a network entity, a request for access to a network slice of a set of network slices, the request including an identifier of the network slice, receive, from the network entity, a first control message indicating that access to the network slice is allowed, establish a session via the network slice for communicating with a base station, send, to the base station, a request for resources for communicating with the base station via the session, and receive, from the base station, a second control message indicating that access to the resources is rejected.

Some examples of the method, apparatuses, and non-transitory computer-readable medium described herein may further include operations, features, means, or instructions for receiving, in the second control message, an indication that access to the resources may be rejected because access to the network slice may be rejected. Some examples of the method, apparatuses, and non-transitory computer-readable medium described herein may further include operations, features, means, or instructions for receiving, in the second control message, at least one condition for retrying to access the resources for communicating with the base station via the network slice.

A method of wireless communication at a network entity is described. The method may include identifying that a UE is attempting to gain access to resources for communicating with a base station via a network slice, determining to reject access to the resources based on one or more parameters associated with the network slice, and sending, to the UE, a control message indicating that access to the resources is rejected.

An apparatus for wireless communication at a network entity is described. The apparatus may include a processor, memory coupled with the processor, and instructions stored in the memory. The instructions may be executable by the processor to cause the apparatus to identify that a UE is attempting to gain access to resources for communicating with a base station via a network slice, determine to reject access to the resources based on one or more parameters associated with the network slice, and send, to the UE, a control message indicating that access to the resources is rejected.

Another apparatus for wireless communication at a network entity is described. The apparatus may include means for identifying that a UE is attempting to gain access to resources for communicating with a base station via a network slice, determining to reject access to the resources based on one or more parameters associated with the network slice, and sending, to the UE, a control message indicating that access to the resources is rejected.

A non-transitory computer-readable medium storing code for wireless communication at a network entity is described. The code may include instructions executable by a processor to identify that a UE is attempting to gain access to resources for communicating with a base station via a network slice, determine to reject access to the resources based on one or more parameters associated with the network slice, and send, to the UE, a control message indicating that access to the resources is rejected.

Some examples of the method, apparatuses, and non-transitory computer-readable medium described herein may further include operations, features, means, or instructions for sending, in the control message, an indication that access to the resources may be rejected because access to the network slice may be rejected. Some examples of the method, apparatuses, and non-transitory computer-readable medium described herein may further include operations, features, means, or instructions for sending, in the control message, at least one condition for retrying to access the resources for communicating with the base station via the network slice.

A method of wireless communication at a UE is described. The method may include sending, to a first network entity, a request for access to a network slice of a set of network slices, the request including an identifier of the network slice and the network slice associated with a first throughput, receiving, from the first network entity, a first control message indicating that access to the network slice is allowed, sending, to a second network entity, a second control message to establish a session via the network slice for communicating with a base station, receiving, from the second network entity, an indication that the session is successfully established and is associated with a second, reduced throughput, and communicating via the session in accordance with the second, reduced throughput.

An apparatus for wireless communication at a UE is described. The apparatus may include a processor, memory coupled with the processor, and instructions stored in the memory. The instructions may be executable by the processor to cause the apparatus to send, to a first network entity, a request for access to a network slice of a set of network slices, the request including an identifier of the network slice and the network slice associated with a first throughput, receive, from the first network entity, a first control message indicating that access to the network slice is allowed, send, to a second network entity, a second control message to establish a session via the network slice for communicating with a base station, receive, from the second network entity, an indication that the session is successfully established and is associated with a second, reduced throughput, and communicate via the session in accordance with the second, reduced throughput.

Another apparatus for wireless communication at a UE is described. The apparatus may include means for sending, to a first network entity, a request for access to a network slice of a set of network slices, the request including an identifier of the network slice and the network slice associated with a first throughput, receiving, from the first network entity, a first control message indicating that access to the network slice is allowed, sending, to a second network entity, a second control message to establish a session via the network slice for communicating with a base station, receiving, from the second network entity, an indication that the session is successfully established and is associated with a second, reduced throughput, and communicating via the session in accordance with the second, reduced throughput.

A non-transitory computer-readable medium storing code for wireless communication at a UE is described. The code may include instructions executable by a processor to send, to a first network entity, a request for access to a network slice of a set of network slices, the request including an identifier of the network slice and the network slice associated with a first throughput, receive, from the first network entity, a first control message indicating that access to the network slice is allowed, send, to a second network entity, a second control message to establish a session via the network slice for communicating with a base station, receive, from the second network entity, an indication that the session is successfully established and is associated with a second, reduced throughput, and communicate via the session in accordance with the second, reduced throughput.

In some examples of the method, apparatuses, and non-transitory computer-readable medium described herein, the first throughput may be associated with a first quality of service and the second, reduced throughput may be associated with a second, lower quality of service. In some examples of the method, apparatuses, and non-transitory computer-readable medium described herein, the first network entity includes an access and mobility management function, and the second network entity includes a session management function.

A method of wireless communication at a network entity is described. The method may include receiving, from a UE, a first control message for establishing a session via a network slice, where access to the network slice is allowed for the UE and is associated with a first throughput and sending, to the UE, an indication that the session is successfully established and is associated with a second, reduced throughput based on one or more parameters associated with the network slice.

An apparatus for wireless communication at a network entity is described. The apparatus may include a processor, memory coupled with the processor, and instructions stored in the memory. The instructions may be executable by the processor to cause the apparatus to receive, from a UE, a first control message for establishing a session via a network slice, where access to the network slice is allowed for the UE and is associated with a first throughput and send, to the UE, an indication that the session is successfully established and is associated with a second, reduced throughput based on one or more parameters associated with the network slice.

Another apparatus for wireless communication at a network entity is described. The apparatus may include means for receiving, from a UE, a first control message for establishing a session via a network slice, where access to the network slice is allowed for the UE and is associated with a first throughput and sending, to the UE, an indication that the session is successfully established and is associated with a second, reduced throughput based on one or more parameters associated with the network slice.

A non-transitory computer-readable medium storing code for wireless communication at a network entity is described. The code may include instructions executable by a processor to receive, from a UE, a first control message for establishing a session via a network slice, where access to the network slice is allowed for the UE and is associated with a first throughput and send, to the UE, an indication that the session is successfully established and is associated with a second, reduced throughput based on one or more parameters associated with the network slice.

In some examples of the method, apparatuses, and non-transitory computer-readable medium described herein, the first throughput may be associated with a first quality of service and the second, reduced throughput may be associated with a second, lower quality of service. In some examples of the method, apparatuses, and non-transitory computer-readable medium described herein, the network entity may be a session management function.

DETAILED DESCRIPTION

Some wireless communications systems may support the use of network slices to support additional features and network function optimizations. A network slice may be a logical end-to-end network that can be dynamically created. Each network slice may be characterized by a set of parameters which may be defined based on a generic network slice template (GST). Some of the parameters in the GST may point explicitly to the definition of parameters and bounds on the service delivered to the end customer. In some cases, however, the enforcement of some of these bounds or the support of some of these parameters may not be enabled. For instance, the GST aims at the limitation of the number of protocol data unit (PDU) sessions per slice, the number of devices supported per slice, or the maximum uplink or downlink data rate per slice, and these parameters may not currently be enforced because conventional systems lack the ability to do so.

As described herein, a wireless communications system may support efficient techniques for handling slice limitations in consideration of GST parameters. A network may support efficient techniques for determining whether to provide access to a network slice, allow the establishment of a session via the network slice, or grant access to resources for communications via the network slice based on GST parameters. As an example, the network may provide access to a network slice, allow the establishment of a session via the network slice, or grant access to resources for communications via the network slice when one or more criteria associated with GST parameters of the network slice are satisfied. Further, a UE may support efficient techniques for determining when or whether to retry to access a network slice, retry to establish a session via the network slice, or retry to access resources for communicating via the network slice based on conditions set in consideration of GST parameters. As an example, a UE may retry to access a network slice, retry to establish a session via the network slice, or retry to access resources for communicating via the network slice when one or more conditions provided to the UE for the network slice based on the GST parameters are satisfied.

Aspects of the disclosure introduced above are described below in the context of a wireless communications system. Examples of processes and signaling exchanges that support handling slice limitations are then described. Aspects of the disclosure are further illustrated by and described with reference to apparatus diagrams, system diagrams, and flowcharts that relate to handling slice limitations.

Figure 1:
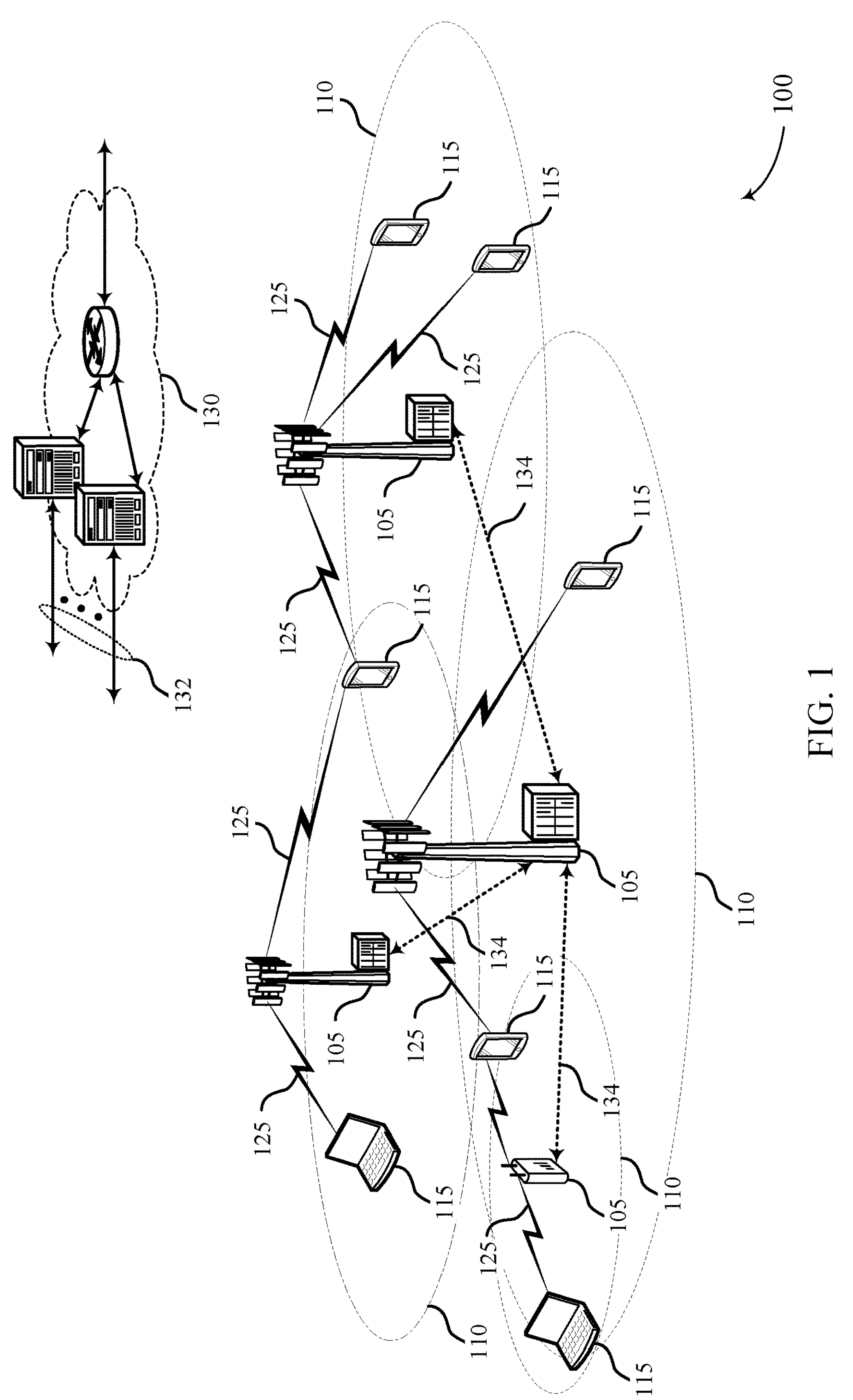
FIG. 1 illustrates an example of a wireless communications system that supports handling slice limitations in accordance with aspects of the present disclosure.

FIG. 1 illustrates an example of a wireless communications system 100 that supports handling slice limitations in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. In wireless communications system 100, one base station 105 or a group of base stations 105 may be referred to as an access network (AN) or a radio access network (RAN) 105.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in a frequency division duplex (FDD) mode) or be configured to carry downlink and uplink communications (e.g., in a time division duplex (TDD) mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some examples, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In wireless communications system 100 (e.g., a 5G system), the functions of the core network 130 may be virtualized to allow for a more flexible architecture. Specifically, the core network 130 may include several entities (or functions) such as an authentication server function (AUSF), an access and mobility management function (AMF), a session management function (SMF), etc. implemented in software. Wireless communications system 100 may also support the use of network slices to support additional features and network function optimizations. A network slice may be a logical end-to-end network that can be dynamically created. Each network slice may be characterized by a set of parameters which may be defined based on a GST.

Some of the parameters in the GST may point explicitly to the definition of parameters and bounds on the service delivered to the end customer. In some cases, however, the enforcement of some of these bounds or the support of some of these parameters may not be enabled. For instance, the GST aims at the limitation of the number of PDU sessions per slice, the number of devices supported per slice, or the maximum uplink or downlink data rate per slice (e.g., which is different from the aggregate maximum bit rate (AMBR) for a UE 115, and is rather a rate limitation per UE 115 or per single network slice selection assistance information (S-NSSAI). These parameters may not currently be enforced because conventional systems lack the ability to do so. For instance, when a UE 115 is rejected for a network slice or a PDU session via a network slice based on GST parameters, it may be appropriate for the UE 115 to determine whether to retry or not. That is, it may be appropriate for the behavior of the UE 115 and the network to be defined. Wireless communications system 100 may support efficient techniques for handling slice limitations in consideration of GST parameters.

Table 1 illustrates an example of GST parameters.

TABLE 1

| GST parameters | | | |
|---|---|---|---|
| GST Parameter | Description | Applicability (mobility management (MM) or session management (SM)) | Network function (NF) awareness |
| Coverage | Specifies the coverage area of the network slice - the area where the terminals can access a | MM: AMF rejects based on location of UE and RAN node a) alternative 1: AMF | AMF via network slice selection function |

TABLE 1-continued

| GST parameters | | | |
|---|---|---|---|
| GST Parameter | Description | Applicability (mobility management (MM) or session management (SM)) | Network function (NF) awareness |
| | particular network slice. E.g. global, national, regional, outdoors, indoors. This may be based on RAN node location and coverage, or geographic partitioning (e.g. partitioning a geographical region into a set of zones/grids, and coverage is described by the zone numbers in which the network slice should be available). | "rejects" a requested NSSAI and indicates when the UE can retry, or b) alternative 2: the AMF "pre-allows" the use of the slice that the UE can use at the SM layer after the "permitted time" elapses If the UE requests a session with the slice that is not yet permitted, the AMF blocks it. | (NSSF), Policy Charging and Control (PCC) |
| Delay tolerance | Provide the network slice customer (NSC) with service delivery flexibility, especially for the vertical services that are not chasing a high system performance. For instance, the service will be delivered once the mobile system has sufficient resources or during the off-peak hours. For this type of traffic, it is not too critical how long it takes to deliver the amount of data, e.g., within hours, days, weeks, etc. For instance, this type of traffic could be scheduled for transmission in dedicated times of the day when the traffic load is low or this traffic could get an own traffic class which is de-prioritized over all other traffic | MM: AMF can enforce it for routing area (RA) or public land mobile network (PLMN) SM (alternative): AMF allows the slice but SMF rejects PDU session establishment a) alternative 1: AMF "rejects" a requested NSSAI and indicates when the UE can retry, or b) alternative 2: the AMF "pre-allows" the use of the slice that the UE can use at the SM layer after the "permitted time" elapses. If the UE requests a session with the slice that is not yet permitted, the AMF blocks it. | AMF via NSSF, SMF via PCC |
| Deterministic communication | Defines if the network slice supports deterministic communication for periodic user traffic (i.e., a transmission interval in which a single packet is transmitted that is repeated). Periodic traffic refers to the type of traffic with periodic transmissions. Can have a periodicity associated in seconds (e.g., Motion control/printing machine - $2*10^3$ seconds; Motion control/machine tool - $500*10^6$ seconds). Determinism refers to whether the delay between transmission of a message and receipt of the message at the destination address is stable (within bounds). A network slice could support multiple periodicities. | AMF decides not to allow the slice and provides a rejection cause indicating the slice is not allowed. Alternatively, the AMF allows the slice (S-NSSAI is put in Allowed NS SAI), and it can be enforced dynamically (e.g. depending on UE location of RAN conditions) after the UE has established a PDU session at the MM level in the UE, AMF or both: If the UE is aware of the parameter, the UE is not allowed to request user plane resources with Service Request procedure for the PDU session ID associated with periodic/deterministic communication. The AMF rejects establishment of user plane resources during PDU session request, and AMF rejects any subsequent Service Request with the Uplink data status | |

TABLE 1-continued

| GST parameters | | | |
|---|---|---|---|
| GST Parameter | Description | Applicability (mobility management (MM) or session management (SM)) | Network function (NF) awareness |
| | | information element and a backoff timer set to the remaining time for this. | |
| Downlink throughput per network slice | Attribute used to set throughput guarantees per network slice (i.e., based on whether the achievable data rate of the network slice in downlink that is available ubiquitously across the coverage area of the slice). This can include a guaranteed downlink throughput and/or a maximum downlink throughput. Maximum throughput can be used to offer different network slice contract qualities level, e.g. gold, silver and bronze which have different maximum throughput values. | MM: AMF determines based on operation, administration, and management (OAM) information<br>Alternative 1: Temporary rejection for RA or Temporary rejection with backoff timer (if network determines inability to support is transitory).<br>Alternative 2: AMF allows the slice and SMF allows the establishment of PDU sessions for the S-NSSAI with a reduced throughput and indicating so to the UE which may then decide to use or release the session. The SMF uses SM procedures to indicate to the UE of any changes when possible at the network. | AMF via NSSF and local configuration |
| Downlink throughput per UE | Used to set different guarantees in terms of throughput experienced by the customer in downlink. Can include a guaranteed downlink throughput and/or a maximum downlink throughput. Orchestrator may use this attribute to orchestrate the resources and (R)AN/core network may use this attribute to optimize the scheduling. | Same as downlink throughput per network slice | AMF via NSSF and local configuration |
| Uplink throughput per network slice | Achievable data rate of the network slice instance in uplink that is available ubiquitously across the coverage area of the network slice (guaranteed uplink throughput, maximum uplink throughput). | Same as downlink throughput per network slice | AMF via NSSF and local configuration |
| Uplink throughput per UE | Dependent on the selected service type, defines as guaranteed uplink throughput and maximum uplink throughput. | Same as downlink throughput per network slice | AMF via NSSF and local configuration |
| Energy efficiency | Describes the energy efficiency of the network slice, i.e., the ratio between the performance indicator, in terms of data volume (DV), and the energy consumption (EC) when assessed during the same time frame. Examples: 180 b/J (Dense urban area), 40 b/J (Urban area), 2 b/J (Rural area). | Unclear how this can be used. Seems AMF based on some NF feeding the measured efficiency to the UE. | AMF |
| Group communication support | Describes which type of group communication is provided by the network slice (e.g. not available, Single Cell Point to | AMF only<br>Permanent rejection per PLMN<br>AMF/SMF rejects if the UE is not part of a group. | AMF via NSSF |

TABLE 1-continued

| GST parameters | | | |
|---|---|---|---|
| GST Parameter | Description | Applicability (mobility management (MM) or session management (SM)) | Network function (NF) awareness |
| | Multipoint (SCPTM), Broadcast/Multicast, Broadcast/Multicast + SCPTM). | | |
| Isolation level | A network slice instance may be fully or partly, logically and/or physically, isolated from another network slice instance (e.g. Physical, Process and threads isolation, Physical memory isolation, Physical network isolation, Logical, Virtual resources isolation, Network functions isolation, Tenant/Service Isolation). | AMF only. Permanent rejection per PLMN This can be applied at the access type level i.e. the UE can either access the slice over 3GPP or non-3GPP access but not both. | AMF via NSSF |
| Location based message delivery | This attribute describes the location-based delivery of information, e.g., GeoNetworking, not related to the geographical spread of the network slice itself. This attribute can be used to distribute information, e.g., signaling messages, to terminals within a specific geographical area. | AMF only Permanent rejection per PLMN | AMF via NSSF |
| Maximum supported packet size | Maximum packet size supported by the network slice and may be important for URLLC (Ultra-Reliable Low Latency Communication) and MIoT (Massive IoT), or to indicate a supported maximum transmission unit (MTU). E.g., eMBB 1500 Bytes; IoT 40 Bytes; URLLC 160 Bytes for 5 ms latency. | AMF Alternative 1: Permanent rejection per RA or per PLMN. Alternative 2: AMF can reject data over control plane (e.g. for CIoT) if the size limit is not enforced. | AMF via NSSF |
| Mission critical support | Mission-critical (MC) leads to a priority of the network slice relative to others, for C-plane (Control Plane) and U-plane (User Plane) decisions. This is relative to a customer provider relationship and to a PLMN (Public land Mobile Network) | AMF Permanent rejection per RA or per PLMN. | AMF via NSSF |
| Mission-critical capability support | Specifies what capabilities are available to support mission-critical services (Inter-user prioritization - admission and the scheduling of priorities for Packet Service users over non-PS users, and different priorities among PS users; pre-emption capability - allows non-PS users to be pre-empted by PS users, and a PS user to | AMF Permanent rejection per RA or per PLMN. | AMF via NSSF |

TABLE 1-continued

| GST parameters | | | |
|---|---|---|---|
| GST Parameter | Description | Applicability (mobility management (MM) or session management (SM)) | Network function (NF) awareness |
| | be pre-empted by another PS user; local control capability - allows dynamic and temporary assignment of inter-user prioritization and pre-emption levels to local PS users, e.g. local to an incident). More than one capability may be supported at once. | | |
| Mission-critical service support | Specifies whether or not the network slice supports mission-critical push-to-talk (MCPTT; MCData; MCVideo; IOPS; MC interworking) | AMF Permanent rejection per RA or per PLMN. | AMF via NSSF |
| MMTel support | Describes whether the network slice supports IP Multimedia Subsystem (IMS) and Multimedia Telephony Service MMTel | AMF Permanent rejection per RA or per PLMN. | AMF via NSSF |
| NSC network functions | Provides a list of network functions to be provided by the NSC, e.g. an NSC can own some Network Functions (e.g., user plane function (UPF), unified data management (UDM) or AUSF). If the list is empty, the NSC is not expected to provide any network function relevant for the network slice instance. | AMF Permanent rejection per RA or per PLMN. | AMF via NSSF |
| Number of connections | Describes the maximum number of concurrent sessions supported by the network slice (e.g. 100,000 sessions). | Alternative 1: AMF provides rejection per RA or per PLMN, possibly with a backoff timer. Alternative 2: AMF allows the slice, but AMF or SMF reject the PDU session establishment. NSSF informs the AMF(s) that the slice has reached the maximum number of PDU sessions. The differentiation may be per local area data network (LADN) connections vs non-LADN connections. | AMF via NSSF |
| Number of terminals | Describes the maximum number of terminals supported by the network slice. | AMF Permanent rejection per RA or per PLMN. | AMF via NSSF |
| Performance monitoring | Provides the capability for NSC and network operator (NOP) to monitor Key Quality Indicators (KQIs) and Key Performance Indicators (KPIs). KQIs reflect the end-to-end service performance and quality while KPIs reflect the performance of the network. E.g., | AMF Permanent rejection per RA or per PLMN. | |

TABLE 1-continued

| GST parameters | | | |
|---|---|---|---|
| GST Parameter | Description | Applicability (mobility management (MM) or session management (SM)) | Network function (NF) awareness |
| | Service Request Success Rate, Monitoring sample frequency (per second, minute, hour, threshold-based). | | |
| Performance prediction | Defines the capability to allow the mobile system to predict the network and service status. Predictive quality of service (QoS) can be done for various KQIs and KPIs. KQIs reflect the end-to-end service performance and quality, while KPIs reflect the performance of the network. The prediction is done for a specific point of time in the future and for a specific geolocation. KQIs and KPIs may include throughput, latency, service request success rate and a frequency of prediction. Comes from interest from 5GAA and ITU-T (Machine Learning for Future Networks including 5G (FG ML5G)). An application programming interface (API) would be provided allowing the NSC to send a request (e.g. KPI prediction for a certain geo-location and a certain time in the future) and receiving the prediction. | AMF Permanent rejection per RA or per PLMN. | AMF via NSSF |
| Positioning support | Describes if the network slice provides geo-localization methods or supporting methods, in terms of availability (e.g. CIF, E-CID, OTDOA, RF fingerprinting, AECID, hybrid positioning, NET-RTK), prediction frequency (e.g. second, minute, hour, threshold-based), and accuracy (e.g. +/−1 m, +/−0.01 m). | AMF Permanent rejection per RA or per PLMN. | AMF via NSSF |
| Radio spectrum | Defines the radio spectrum supported by the network slice. | AMF Permanent rejection per RA or per PLMN. | AMF via OAM. |
| Root cause investigation | Capability provided to NSC to understand or investigate the root cause of network service performance degradation or failure. | AMF Permanent rejection per RA or per PLMN. | AMF via OAM. |
| Session and Service Continuity support | SSC mode 1, 2, 3, none. | AMF for networks where only one SSC is supported. Permanent rejection per PLMN. SMF if depending on UPF and area. May be temporary rejection with conditions. | AMF or SMF |

TABLE 1-continued

| GST parameters | | | |
|---|---|---|---|
| GST Parameter | Description | Applicability (mobility management (MM) or session management (SM)) | Network function (NF) awareness |
| Simultaneous use of the network slice | Describes whether a network slice can be simultaneously with other network slice and if so, which group the network slice belongs to. This corresponds to Mutually Exclusive Slice idea of SA2 (can be used with any slice; can be used with slices with same slice or service type (SST) value; can be used with any slice with same SD value; cannot be used with another slice; operator defined class) | AMF<br>Permanent rejection per PLMN | AMF via NSSF |
| Slice quality of service parameters | Defines all the QoS relevant parameters supported by the network slice based on 5G NR standardized QoS identifiers (5QIs), resource type (e.g., guaranteed bit rate (GBR) for mission critical video user plane, delay critical GBR for intelligent transport systems, non-GBR for voice), priority level in scheduling resources among QoS Flows (used to differentiate between QoS Flows of the same UE and between QoS Flows from different UEs), PDB, PER, jitter, maximum packet loss rate. | AMF if QoS cannot be satisfied independently of UPF. Permanent rejection per PLMN or RA.<br>SMF if the QoS depends on e.g., specific location, status, etc. This is a normal rejection of QoS. | AMF via NSSF<br>SMF via policy control function (PCF) or UPF availability |
| Support for non-IP traffic | UPF may use Ethernet session and forwarding to transmit package as customized network slice ability to fully meet the communication requirement of some vertical industries application scenarios. Per data network name (DNN). | AMF if no support at all, independently of DNN. Permanent rejection per PLMN.<br>SMF based on DNN (since at registration AMF does not know the needed DNN). Permanent rejection for the DNN. | AMF or SMF |
| Supported access technologies | Defines which access technologies are supported by the network slice (e.g., GERAN, UTRAN, E-UTRA, NR, LTE-M, NB-IoT, Wi-Fi, Bluetooth, fixed). | AMF<br>Permanent rejection per RA | AMF |
| Supported device velocity | Maximum speed supported by the network slice at which a defined QoS and seamless transfer between RAN nodes can be achieved. Used for URLLC services. | AMF<br>Permanent rejection per RA | AMF based on RAN information |
| Synchronicity | Defines synchronicity of communication devices: synchronicity between a base station and a mobile device and synchronicity between mobile devices. | | SMF |

TABLE 1-continued

| GST parameters | | | |
|---|---|---|---|
| GST Parameter | Description | Applicability (mobility management (MM) or session management (SM)) | Network function (NF) awareness |
| | Used for industrial environments. | | |
| Terminal density | Describes the maximum number of connected and/or accessible devices per unit area (per km2) supported by the network slice. | AMF Permanent rejection per RA | AMF based on RAN information |
| User management openness | Describes the capability for the NSC to manage their users or groups of users' network services and corresponding requirements. For instance, if NSC Y orders a network slice which is capable to support X users of Y, then Y should be capable to decide which X users could use this network slice. Hence, Y could manage the users, in terms of add, modify or delete users to receive network services provided by the specific network slice. | | |
| User data access | Defines how the network slice (or mobile network) should handle the user data (e.g. device has access to the Internet; all data traffic is routed to the private network via tunneling mechanism; all data traffic stays local and the devices do not have access to the Internet or private network), and tunneling mechanism (e.g. L2TP, GRE, VPN, label based routing, etc.) | AMF Rejection per PLMN | AMF |
| V2X communication mode | Describes if the V2X communication mode is supported by the network slice (e.g. no, E-UTRA, NR, NR and E-UTRA). | AMF Permanent rejection per RA | AMF |

Figure 2:
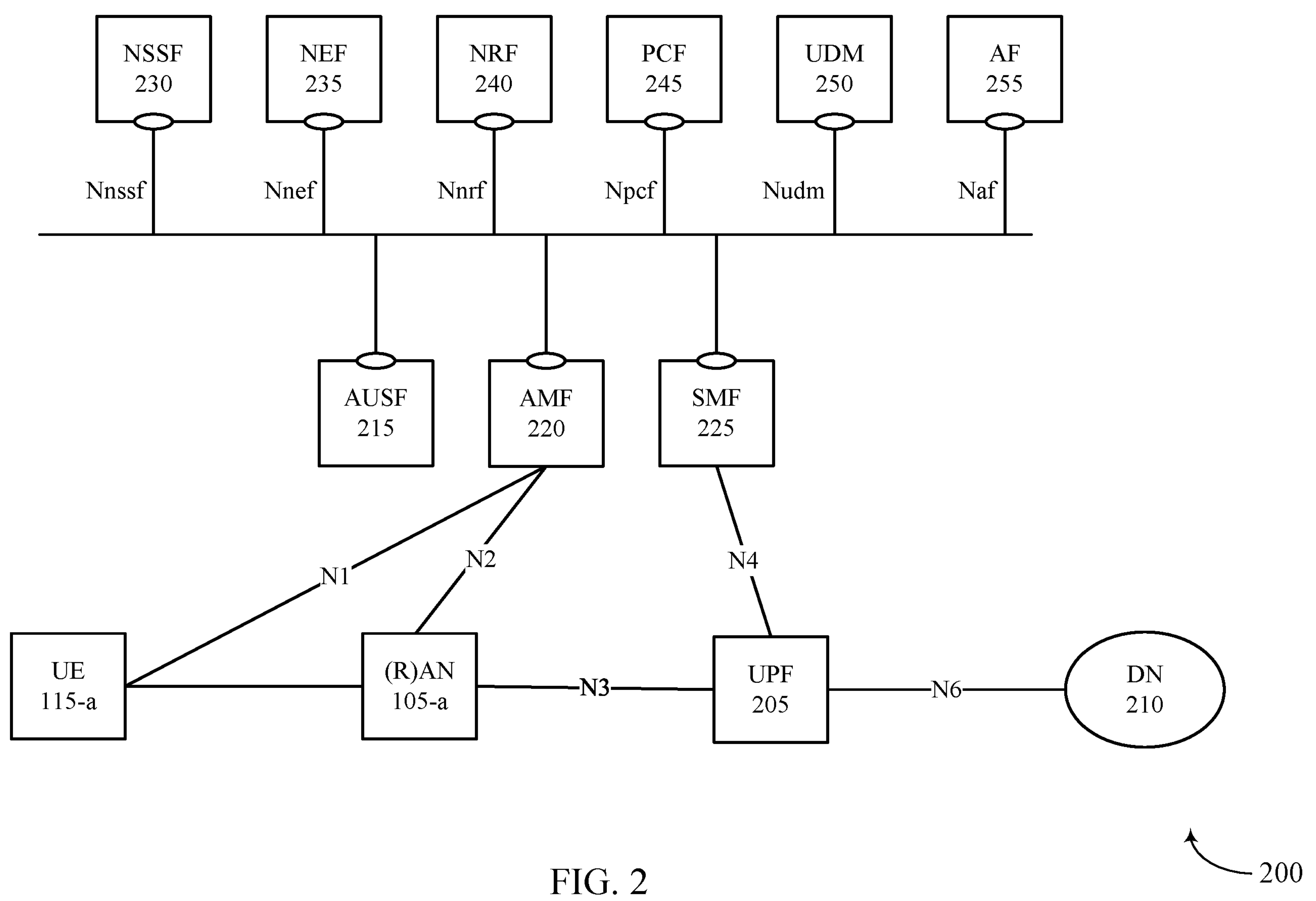
FIG. 2 illustrates an example of a wireless communications system architecture that supports handling slice limitations in accordance with aspects of the present disclosure.

FIG. 2 illustrates an example of a wireless communications system architecture 200 that supports handling slice limitations in accordance with aspects of the present disclosure. Wireless communications system architecture 200 may include UE 115-*a*, RAN 105-*a* (e.g., base station 105-*a*), UPF 205, data network (DN) 210, AUSF 215, AMF 220, SMF 225, NSSF 230, network exposure function (NEF) 235, NF repository function (NRF) 240, PCF 245, UDM 250, and application function (AF) 255. In addition, wireless communications system architecture 200 may include other functions or entities not displayed in FIG. 2 or may not include one or more of the functions or entities shown.

In the example of FIG. 2, the wireless communications system architecture 200 may support the use of network slices to support additional features and network function optimizations. A network slice defined within a public land mobile network (PLMN) may include the core network control plane and the user plane network functions and, in the serving PLMN, the next generation (NG) RAN and the N31WF functions to the non-3GPP access network. Network slices may differ for supported features and network optimizations. The operator may deploy multiple network slice instances delivering exactly the same features but for different groups of UEs (e.g., as they deliver a different committed service or because they may be dedicated to a customer). A single UE can simultaneously be served by one or more network slice instances via a 5G AN. Limitations may be applied for a number of concurrent slices. For example, a limit may be set to eight (8) slices, meaning that a single UE may be served by at most eight network slices at a time. The AMF instance serving the UE logically belongs to each of the network slice instances serving the UE (e.g., this AMF instance is common to the network slice instances serving a UE).

The selection of the set of network slice instances for a UE, where each of the network slice instances can correspond to one or more allowed S-NSSAIs, is triggered by the first contacted AMF in a registration procedure normally by interacting with the NSSF, and it may lead to a change of AMF. An S-NSSAI may be used to uniquely identify a network slice. SMF discovery and selection within the selected network slice instance may be initiated by the AMF when a session management (SM) message to establish a PDU session is received from the UE. The NRF is used to assist the discovery and selection tasks of the required network functions for the selected network slice instance. A PDU session may belong to one and only one specific network slice instance per PLMN. In some cases, different network slice instances may not share a PDU session, though different slices may have slice-specific PDU sessions using the same DNN As mentioned above, an S-NSSAI may identify a network slice and may include a SST and a slice differentiator (SD). The SST may refer to the expected network slice behavior in terms of features and services, and the SD may be optional information that complements the SST to differentiate amongst multiple network slices of the same SST. The S-NSSAI may have standard values or PLMN-specific values. S-NSSAIs with PLMN-specific values may be associated to the PLMN identification (ID) of the PLMN that assigns it. An S-NSSAI may not be used by the UE in access stratum procedures in any PLMN other than the one to which the S-NSSAI is associated. The network slice selection assistance information (NSSAI) is a collection of S-NSSAIs. In some examples, there may be at most eight S-NSSAIs in the NSSAI sent in signaling messages between the UE and the network. Each S-NSSAI assists the network in selecting a particular network slice instance. The same network slice instance may be selected by means of different S-NSSAIs.

Based on the operational or deployment plans of the operator, multiple network slice instances of a given S-NSSAI may be deployed in the same or in different registration areas. When multiple network slice instances of a given S-NSSAI are deployed in the same registration area, the AMF instance serving the UE may logically belong to more than one network slice instance of that S-NSSAI (e.g., this AMF instance may be common to multiple network slice instances of that S-NSSAI). When an S-NSSAI is supported by more than one network slice instance in a PLMN, any of the network slice instances supporting the same S-NSSAI in a certain area may serve, as a result of a network slice instance selection procedure, a UE which is allowed to use this S-NSSAI. Upon association with an S-NSSAI, the UE is served by the same network slice instance for that S-NSSAI until cases occur where, for example, the network slice instance is no longer valid in a given registration area, or a change in the allowed NSSAI for a UE occurs, etc.

The selection of a network slice instance serving a UE and the core network control plane and user plane network functions corresponding to the network slice instance may be the responsibility of a 5G core network (5GC). The RAN may use requested NSSAI in access stratum signaling to handle the UE control plane connection before the 5GC informs the RAN of the allowed NSSAI. The requested NSSAI may not be used by the RAN for routing when the UE also provides a temporary user ID. When a UE is successfully registered, the core network informs the RAN by providing the whole allowed NSSAI for the control plane aspects. When a PDU Session for a given S-NSSAI is established using a specific network slice instance, the core network provides to the RAN the S-NSSAI corresponding to this network slice instance to enable the RAN to perform access specific functions.

Subscription information may contain multiple S-NSSAIs. One or more of the subscribed S-NSSAIs can be marked as default S-NSSAIs. In some cases, at most eight S-NSSAIs can be marked as default S-NSSAIs. However, the UE may subscribe to more than eight S-NSSAIs. If an S-NSSAI is marked as default, then the network is expected to serve the UE with the related network slice when the UE does not send any valid S-NSSAI to the network in a registration request message. Subscription information for each S-NSSAI may contain multiple DNNs and one default DNN. The NSSAI the UE provides in the registration request is verified against the subscription data of the UE.

A UE may be configured by the home PLMN (HPLMN) with a configured NSSAI per PLMN. A configured NSSAI may be PLMN-specific and the HPLMN may indicate the PLMN(s) to which each configured NSSAI applies, including whether the configured NSSAI applies to all PLMNs. That is, the configured NSSAI conveys the same information regardless of the PLMN the UE is accessing (e.g. this could be possible for NSSAIs containing only standardized S-NSSAIs). When providing a requested NSSAI to the network upon registration, the UE in a given PLMN may use S-NSSAIs belonging to the configured NSSAI, if any, of that PLMN. Upon successful completion of a registration procedure at a UE, the UE may obtain from the AMF an allowed NSSAI for this PLMN, which may include one or more S-NSSAIs. These S-NSSAIs may be valid for the current registration area provided by the serving AMF the UE has registered with and can be used simultaneously by the UE (e.g., up to the maximum number of simultaneous network slices or PDU sessions). The UE may also obtain from the AMF one or more temporarily or permanently rejected S-NSSAIs.

The allowed NSSAI shall take precedence over the configured NSSAI for this PLMN. The UE may use the S-NSSAI(s) in the allowed NSSAI corresponding to a network slice for the subsequent procedures in the serving PLMN. In some cases, the UE may store (S)NSSAIs. For instance, when the UE is provisioned with a configured NSSAI for a PLMN in the UE, the configured NSSAI may be stored in the UE until a new configured NSSAI for this PLMN is provisioned in the UE by the HPLMN. When provisioned with a new configured NSSAI for a PLMN, the UE may both replace any stored configured NSSAI for this PLMN with the new configured NSSAI and may delete any store allowed NSSAI and rejected S-NSSAI for this PLMN. If received, the allowed NSSAI for a PLMN may be stored in the UE, including when the UE is turned off, until a new allowed NSSAI for this PLMN is received. When a new allowed NSSAI for a PLMN is received, the UE may replace any stored allowed NSSAI for this PLMN with this new allowed NSSAI. If received, a temporarily rejected S-NSSAI for a PLMN may be stored in the UE while registered under registration management (RM) (e.g., RM-registered). If received, a permanently rejected S-NSSAI for a PLMN may be stored in the UE while RM-registered.

One or multiple of the S-NSSAIs in the allowed NSSAI provided to the UE can have non-standardized values, which may not be a part of the NSSAI configuration at the UE. In such cases, the allowed NSSAI may include mapping information indicating how the S-NSSAIs in the allowed S-NSSAI correspond to S-NSSAI(s) in the configured NSSAI in the UE. The UE uses this mapping information for its internal operation (e.g., finding an appropriate network slice for services at the UE). Specifically, a UE application, which is associated with an S-NSSAI as per network slice service profile (NSSP), is further associated with the corresponding S-NSSAI from the allowed NSSAI.

The establishment of user plane connectivity to a data network via a network slice instance may include performing an RM procedure to select an AMF that supports the required network slices and establishing one or more PDU sessions to the required data network via the network slice instances. When a UE registers with a PLMN, if the UE for this PLMN has a configured NSSAI or an allowed NSSAI, the UE may provide to the network in RRC and a non-access stratum (NAS) layer a requested NSSAI containing the S-NSSAIs corresponding to the slices to which the UE wishes to register, in addition to the temporary user ID if one was assigned to the UE. In one example, the requested NSSAI may be the configured NSSAI, or a subset thereof, if the UE has not allowed NSSAI for the serving PLMN. In another example, the requested NSSAI may be the allowed NSSAI, or a subset thereof, if the UE has an allowed NSSAI for the serving PLMN. In yet another example, the requested NSSAI may be the allowed NSSAI, or a subset thereof, plus one or more S-NSSAIs from the configured NSSAI for which no corresponding S-NSSAI is present in the allowed NSSAI and that were not previously permanently rejected by the network.

The subset of configured NSSAI provided in the requested NSSAI may include one or more S-NSSAIs in the configured NSSAI applicable to this PLMN, if the S-NSSAI was not previously permanently rejected by the network or was not previously added by the UE in a requested NSSAI. The subset of allowed NSSAI provided in the requested NSSAI may include one or more S-NSSAIs in the last allowed NSSAI for this PLMN. The UE may provide in the requested NSSAI an S-NSSAI from the configured NSSAI that the UE previously provided to the serving PLMN in the present registration area if the S-NSSAI was not previously permanently rejected by the network. The UE may include the requested NSSAI at RRC connection establishment and in NAS messages. The RAN may route the NAS signaling between this UE and an AMF selected using the requested NSSAI obtained during RRC connection establishment. If the RAN is unable to select an AMF based on the requested NSSAI, the RAN may route the NAS signaling to an AMF from a set of default AMFs.

When a UE registers with a PLMN, if for this PLMN the UE has no configured NSSAI or allowed NSSAI, the RAN may route all NAS signaling from or to this UE to or from a default AMF. The UE may not indicate any NSSAI in RRC connection establishment or in an initial NAS message unless it has a configured NSSAI or allowed NSSAI for the corresponding PLMN. When receiving from the UE a requested NSSAI and a 5G serving temporary mobile subscriber identity (S-TMSI) in RRC, if the RAN can reach an AMF corresponding to the 5G-S-TMSI, then the RAN may forward the request to this AMF. Otherwise, the RAN may select a suitable AMF based on the requested NSSAI provided by the UE and forwards the request to the selected AMF. If the RAN is not able to select an AMF based on the requested NSSAI, then the request may be sent to a default AMF.

When the AMF selected by the AN receives the UE initial registration request, as part of a registration procedure, the AMF may query the UDM to retrieve UE subscription information including the subscribed S-NSSAIs. The AMF may also verify whether the S-NSSAIs in the requested NSSAI are permitted based on the subscribed S-NSSAIs. Further, when the UE context in the AMF does not yet include an allowed NSSAI, the AM may query the NSSF, except in the case when, based on configuration in this AMF, the AMF is allowed to determine whether it can serve the UE. In some cases, the configuration may depend on the policy of the operator. When the UE context in the AMF already includes an allowed NSSAI, based on configuration for this AMF, the AMF may be allowed to determine whether it can serve the UE.

In some cases, depending on fulfilling the configuration, the AMF may be allowed to determine whether it can serve the UE. In addition, the AMF may check whether it can serve all the S-NSSAIs from the request NSSAI present in the subscribed S-NSSAIs, or all the S-NSSAIs marked as default in the subscribed SN-NSSAIs in case no requested NSSAI was provided. If this is the case, the AMF may remain the serving AMF for the UE. The allowed NSSAI may then be composed of the list of S-NSSAIs in the requested NSSAI permitted based on the subscribed S-NSSAIs, or, if no requested NSSAI was provided, all the S-NSSAIs marked as default in the subscribed S-NSSAIs. If this is not the case, the AMF may query the NSSF.

When it is appropriate for the AMF to query the NSSF, the AMF may query the NSSF, with the requested NSSAI, the subscribed S-NSSAIs, PLMN ID of the subscription permanent identifier (SUPI), location information, and possibly access technology being used by the UE. Based on this information, local configuration, and other locally available information including RAN capabilities in the registration area, the NSSF may perform one or more operations. For example, the NSSF may select the network slice instances to serve the UE. When multiple network slice instances in the registration area are able to serve a given S-NSSAI, based on the configuration of an operator, the NSSF may select one of them to serve the UE, or the NSSF may defer the selection of the network slice instance until it is appropriate for an NF or service within the network slice instance to be selected. The NSSF may also determine the target AMF set to be used to serve the UE, or, based on configuration, the list of candidate AMFs, possibly after querying the NRF. The NSSF may further determine the allowed NSSAI, possibly taking into account the availability of the network slice instances that are able to serve the S-NSSAIs in the allowed NSSAI in the current registration area.

Based on operator configuration, the NSSF may determine the NRFs to be used to select NFs or services within the selected network slice instances. In some cases, there may be additional processing to determine the allowed NSSAI in roaming scenarios. The NSSF may return to the current AMF the allowed NSSAI and the target AMF set, or, based on configuration, the list of candidate AMFs. The NSSF may return the NRFs to be used to select NFs or services within the selected network slice instances. The NSSF may also return information regarding rejection causes for S-NSSAIs not included in the allowed NSSAI which were part of the requested NSSAI. Depending on the available information and based on configuration, the AMF may query the NRF with the target AMF set. The NRF may return a list of candidate AMFs. If rerouting to a target serving AMF is appropriate, the current AMF may reroute the registration request to a target serving AMF.

In some cases, the serving AMF may return to the UE the allowed NSSAI. The serving AMF may also indicate to the UE for requested NSSAIs not included in the allowed NSSAI, whether the rejection is permanent (e.g., the S-NSSAI is not supported in the PLMN) or temporary (e.g., the S-NSSAI is not currently available in the registration area).

Upon successful registration, the UE may be provided with a 5G-S-TMSI by the serving AMF. The UE may include this 5G-S-TMSI in any RRC connection establishment during subsequent initial accesses to enable the RAN to route the NAS signaling between the UE and the appropriate AMF. If the UE receives an allowed NSSAI from the serving AMF, the UE may store this new allowed NSSAI and override any previously stored allowed NSSAI for this PLMN.

The set of network slices for a UE may be changed at any time while the UE is registered with a network and may be initiated by the network or the UE under certain conditions. In some cases, the registration area allocated by the AMF to the UE may have homogenous support for network slices. The network, based on local policies, subscription changes or UE mobility, operational reasons (e.g., a network slice is no longer available), may change the set of network slices to which the UE is registered and may provide the UE new allowed NSSAI. The network may perform such a change during a registration procedure or may trigger a notification towards the UE of the change of the network slices using a generic UE configuration update procedure. The new allowed NSSAI may be determined and an AMF relocation may be performed. The AMF provides the UE with the new allowed NSSAI and tracking area ID (TAI).

If the changes to the allowed NSSAI do not require the UE to perform a registration procedure, the AMF may indicate that acknowledgment is required, but may not indicate the need to perform a registration procedure. The UE may respond with a UE configuration update complete message for the acknowledgment. If the changes to the allowed NSSAI require the UE to perform a registration procedure (e.g., the new S-NSSAIs require a separate AMF that cannot be determined by the current serving AMF), the serving AMF may indicate to the UE that the current 5G globally unique temporary identity (GUTI) is invalid and the need for the UE to perform a registration procedure after entering a connection management (CM) idle (CM-IDLE) state. The AMF may release the NAS signaling connection to the UE to allow the UE to enter CM-IDLE based on local policies (e.g., immediately or delayed release). The UE may not perform a registration procedure before entering the CM-IDLE state. The UE may initiate a registration procedure after the UE enters the CM-IDLE state. The UE may include SUPI and the new allowed NSSAI in the registration in this case.

When a network slice used for a one or multiple PDU sessions becomes no longer available for a UE, in addition to sending the new allowed NSSAI to the UE, the following may apply. In particular, in the network, if the network slice becomes no longer available under the same AMF (e.g., due to a UE subscription change), the AMF may indicate to the SMF corresponding to the relevant S-NSSAI to autonomously release the SM context of the UE. Further, in the network, if the network slice becomes no longer available with AMF relocation (e.g., due to a registration area change), the new AMF may indicate to the old AMF that the PDU sessions associated with the relevant S-NSSAI may be released. The old AMF informs the corresponding SMFs to autonomously release the SM context of the UE. In the UE, the PDU sessions context may be implicitly released after receiving the allowed NSSAI in the registration accept message. The UE may use UE configuration (e.g., NSSP) to determine whether ongoing traffic may be routed over existing PDU sessions belonging to other network slices or establish new PDU sessions associated with the same or other network slices. In order to change the set of S-NSSAIs being used, the UE may initiate a registration procedure. The change of the set of S-NSSAIs to which the UE is registered (e.g., whether UE or network initiated) may lead to AMF change subject to operator policy.

During a registration procedure in a PLMN, in case the network decides that the UE should be served by a different AMF based on network slice aspects, then the AMF that first received the registration request may redirect the registration request to another AMF via the RAN or via direct signaling between the initial AMF and the target AMF. The redirection message sent by the AMF via the RAN may include information for selection of a new AMF to serve the UE. For a UE that is already registered, the system may support a redirection initiated by the network of a UE from its serving AMF to a target AMF due to network slice considerations (e.g. the operator has changed the mapping between the network slice instances and their respective serving AMFs). Operator policy determines whether redirection between AMFs is allowed.

The establishment of a PDU session in a network slice to a DN may allow data transmission in a network slice. A DN may be associated to an S-NSSAI and a DNN. The network operator (HPLMN) may provision the UE with a NSSP. The NSSP may include one or more NSSP rules each one associating an application with a certain S-NSSAI. A default rule which may match all applications to a S-NSSAI may also be included. When a UE application associated with a specific S-NSSAI requests a data transmission, then, if the UE has one or more PDU sessions established corresponding to the specific S-NSSAI, the UE may route the user data of this application in one of these PDU sessions, unless other conditions in the UE prohibit the use of these PDU sessions. If the application provides a DNN, then the UE considers also this DNN to determine which PDU session to use.

In some cases, the UE may store the NSSP until a new NSSP is provided to the UE by the HPLMN. If the UE does not have a PDU session established with this specific S-NSSAI, the UE may request a new PDU session corresponding to this S-NSSAI and with the DNN that may be provided by the application. In order for the RAN to select a proper resource for supporting network slicing in the RAN, it may be appropriate for the RAN to be aware of the network slices used by the UE. If a network slice instance was not selected during the registration procedure for this specific S-NSSAI, the AMF may query the NSSF with this specific S-NSSAI, location information, PLMN ID of the SUPI to select the network slice instance to serve the UE and to determine the NRF to be used to select NFs or services within the selected network slice instance. The AMF may query the NRF to select an SMF in a network slice instance based on S-NSSAI, DNN, and other information (e.g., UE subscription and local operator policies, when the UE triggers the establishment of a PDU session). The selected SMF may establish a PDU session based on S-NSSAI and DNN. When the AMF belongs to multiple network slices, based on configuration, the AMF may use an NRF at the appropriate level for the SMF selection.

Figure 3:
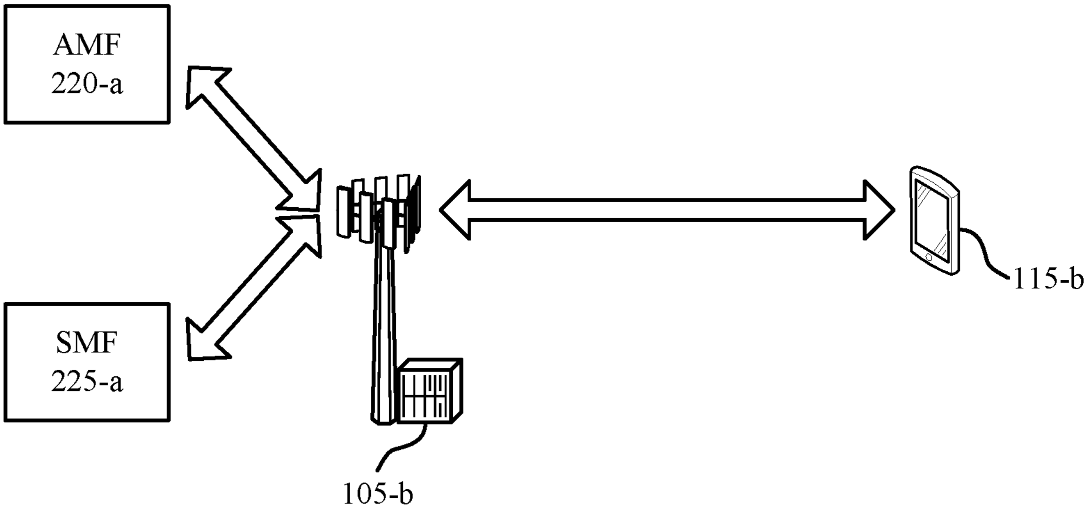
FIG. 3 illustrates an example of a wireless communications system that supports handling slice limitations in accordance with aspects of the present disclosure.
Figure 3:

FIG. 3 illustrates an example of a wireless communications system 300 that supports handling slice limitations in accordance with aspects of the present disclosure. The wireless communications system 300 may include a UE 115-*b*, a base station 105-*b*, an AMF 220-*a*, and an SMF 225-*a*, which may be examples of the corresponding devices described with reference to FIGS. 1 and 2. In the example of FIG. 3, the UE 115-*b* may transmit a requested NSSAI to AMF 220-*a* requesting access to multiple network slices each associated with an S-NSSAI in the NSSAI, and AMF 220-*a* may determine whether criteria associated with GST parameters for each network slice are satisfied. That is, for each S-NSSAI requested by the UE 115-*b* in the requested NSSAI and that is allowable for the UE based on subscription data, the AMF 220-*a* may determine if relevant GST parameters corresponding to the slice associated to the S-NSSAI can be satisfied. If the criteria associated with GST parameters for a S-NSSAI can be satisfied, the AMF 220-*a* may return the S-NSSAI in the allowed NSSAI transmitted to UE 115-*b*. Otherwise, the AMF 220-*a*, SMF 225-*a*, base station 105-*b*, and UE 115-*b* may use the techniques described herein to efficiently handle the limitations of the network slice corresponding to the S-NSSAI.

In one example, the AMF 220-*a* may return the S-NSSAI in the rejected NSSAI transmitted to UE 115-*b* providing a specific rejection cause. The specific rejection cause may be that access to the network slice corresponding to the S-NSSAI is rejected. If the network slice is not allowed only under specific conditions that may change over time depending on the GST parameters, the AMF 220-*a* may include a backoff timer associated with the network slice corresponding to the S-NSSAI in the rejected NSSAI transmitted to UE 115-*b* in addition to existing information provided to the UE 115-*b* in the rejected NSSAI. The AMF 220-*a* may calculate the backoff timer based on the GST parameter conditions for the S-NSSAI, and the UE 115-*b* may not attempt to register again for the S-NSSAI until the backoff timer has expired. The backoff timer may be specific to the network slice corresponding to the S-NSSAI (e.g., the UE may register to different slices associated with different S-NSSAI before the backoff time expires).

The backoff timer may be one condition for determining when to retry to access the S-NSSAI, and, in some cases, the UE 115-*b* may be configured to retry to access the S-NSSAI based on other conditions. For example, if the slice is not allowed only under specific conditions that may change over time (e.g., coverage based on RAN node location and coverage or geographic partitioning), the UE 115-*b* may be configured to retry to access the S-NSSAI when the conditions change. The AMF 220-*a* may indicate the conditions (e.g., different location) in the rejected NSSAI transmitted to UE 115-*b*. Once the backoff timer expires or conditions for allowing access are satisfied, the UE 115-*b* may be allowed to register again by transmitting a new requested NSSAI containing the S-NSSAI for which the timer has expired (e.g., even if the UE 115-*b* is in the same registration area) or for which the conditions for allowing access are satisfied.

In another example, the AMF 220-*a* may return the S-NSSAI in the allowed NSSAI transmitted to UE 115-*b*. In some cases, the AMF 220-*a* may then store information associated with the conditions that do not allow the slice (e.g., after a period of time, location, etc.), and, if the UE 115-*b* requests a PDU session for the network slice that is not yet permitted, the AMF 220-*a* may reject the establishment of the PDU session (e.g., based on the stored information) with a specific cause and optionally a backoff timer. In other cases (e.g., for session and service continuity (SSC) support), the SMF 225-*a* may reject the establishment of the PDU session based on specific conditions related to the GST parameters associated with the network slice with a specific rejection cause (e.g., required SSC mode not supported). SSC modes that may be supported by a network may include, for example, SSC mode 1, SSC mode 2, or SSC mode 3. SSC mode 1 may include preserving the IP anchor for the PDU session (e.g., the anchor UPF may be maintained throughout the session lifetime regardless of UE mobility). Using SSC mode 2, the session may be broken and reestablished (e.g., the network may release the UE's IP address and establish a new session with a new anchor UPF). SSC mode 3 may involve make-before-break session mobility without IP continuity. That is, the network may select a PDU Session Anchor UPF for new sessions while maintaining existing sessions. The UE may determine the type of SSC mode to select based on a mode selection policy that may associate applications or groups of applications to SSC modes. Thus, the UE 115-*b* may request an SSC mode with a session establishment, and the SMF 225-*a* may reject the establishment of the PDU session due to lack of support for the SSC mode, including a cause in the rejection indicating lack of support for the SSC mode. Because the UE 115-*b* knows that the rejection was for lack of support for the SSC mode, if an attempt to establish a new session (e.g., associated with a different application) is initiated, the UE 115-*b* may request a new session associated with a different SSC mode instead of suppressing the initiation of the session. The SMF 225-*a* may provide a condition indicating when the UE 115-*b* can retry to access the S-NSSAI (e.g., area where the PDU session may be rejected or allowed). Once the condition is satisfied, the UE 115-*b* may be allowed to register again by transmitting a new requested NSSAI containing the S-NSSAI for which the condition is satisfied.

In yet another example (e.g., for delay tolerance and deterministic communications), the AMF 220-*a* may provide the S-NSSAI in the allowed NSSAI transmitted to UE 115-*b* and may allow the UE 115-*b* to establish a PDU session for the S-NSSAI. However, no user plane resources may be established for the PDU session. For example, the AMF 220-*a* or the SMF 225-*a* may reject or block access to resources (e.g., requested by UE 115-*b*). In some cases, the AMF 220-*a* may reject further user plane establishment via a service request by providing a backoff timer with a specific cause. In yet another example (e.g., when the maximum number of connections per slice is reached), the AMF 220-*a* may provide the S-NSSAI in the allowed NSSAI transmitted to UE 115-*b* (e.g., allow the slice), and the SMF 225-*a* may allow the establishment of PDU sessions via the S-NSSAI with a reduced throughput. The SMF 225-*a* may indicate that a PDU session is established via the S-NSSAI with a reduced throughput (e.g., lower quality of service (QOS), and the UE 115-*b* may determine whether to use or release the session. The SMF 225-*a* may use session management procedures to indicate to the UE 115-*b* any changes when possible at the network.

Additionally or alternatively, the AMF 220-*a* may store information regarding the S-NSSAIs rejected due to GST parameters, and, if the GST restrictions are invalidated (e.g., no longer valid), the AMF 220-*a* may inform the UE 115-*b* that the S-NSSAI is available (e.g., that access to the S-NSSAI is allowed for the UE 115-*b*). In one aspect, the AMF 220-*a* may send a new indication of allowed NSSAIs to the UE in a new NAS message. In another aspect, the AMF 220-*a* may perform a UE configuration update procedure to provide the UE with a new allowed NSSAI that contains the S-NSSAIs for which the GST restrictions are invalidated (e.g., do not apply anymore).

Using the techniques described above, a network may consider GST parameters when determining whether to accept or reject access to network slices, establishment of PDU sessions, or even access to resources. Further, the UE 115-*b* may be configured to retry to access a network slice, establish a PDU session, or access resources based on conditions received from the network. For example, in the event that an S-NSSAI is placed by the AMF 220-*a* in the allowed NSSAI, the S-NSSAI may be associated with conditions as to when the S-NSSAI may be used. Further, the conditions may be populated based on the core network processing of GST parameters associated with the UE subscription and the specific slice (S-NSSAI). The UE 115-*b* may then allow, for example, PDU session establishment for the S-NSSAI based on the received conditions.

In addition, or as an alternative to using the techniques described above for retrying to access a network slice after access to the network slice is rejected, the UE 115-*b* may be configured to avoid attempting to access a network slice when the network slice may be rejected based on GST parameters. In particular, a network may set conditions in a UE route selection policy (URSP) based on GST parameters, and the UE 115-*b* may avoid rejection based on GST parameters by suppressing attempts to access a network slice when the network slice may be rejected based on GST parameters. That is, the UE 115-*b* may attempt to access the network slice when the conditions in the URSP are satisfied. For example, if the UE 115-*b* is at a first location, and the URSP indicates that access to a network slice is to be allowed when the UE 115-*b* is at a second location (e.g., within a coverage area), the UE 115-*b* may not attempt to access the network slice until the UE 115-*b* is at the second location. That is, based on GST limitations associated with an S-NSSAI, the UE 115-*b* and S-NSSAI specific URSP delivered to the UE 115-*b* may allow connectivity to a given slice when relevant GST attributes are valid (e.g., availability, coverage, etc.).

Figure 4:
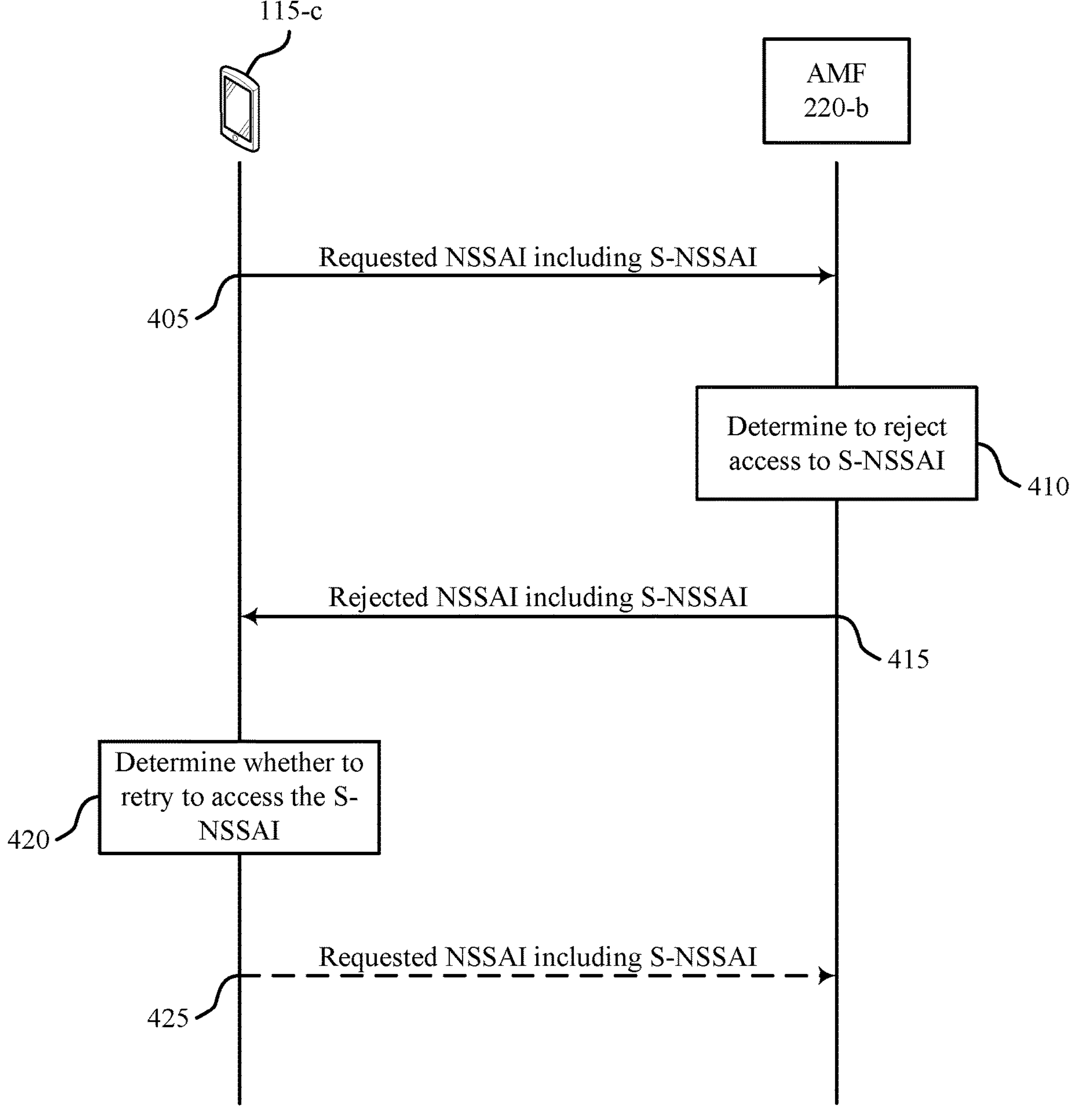
FIG. 4 through 8 illustrate examples of process flows that support handling slice limitations in accordance with aspects of the present disclosure.

FIG. 4 illustrates an example of a process flow 400 that supports handling slice limitations in accordance with aspects of the present disclosure. The process flow 400 illustrates aspects of techniques performed by a UE 115-*c*, which may be an example of a UE 115 described with reference to FIGS. 1-3. The process flow 400 also illustrates aspects of techniques performed by an AMF 220-*b*, which may be an example of an AMF 220 described with reference to FIGS. 2 and 3. As described herein, process flow 400 may support efficient techniques for handling slice limitations in consideration of GST parameters.

At 405, UE 115-*c* may send a requested NSSAI message (e.g., via a base station 105) including an S-NSSAI to AMF 220-*b* to request access to a network slice corresponding to the S-NSSAI. That is, UE 115-*c* may send a first request for access to the network slice (e.g., of a set of network slices), the first request including an identifier of the network slice (e.g., the S-NSSAI). At 410, AMF 220-*b* may then determine whether to allow or reject access to the network slice based on whether criteria associated with the GST parameters of the network slice are satisfied. In the example of FIG. 4, the AMF 220-*b* may determine to reject access to the network slice corresponding to the S-NSSAI based on the criteria associated with the GST parameters of the network slice. For instance, the AMF 220-*b* may determine that the criteria associated with the GST parameters of the network slice are not satisfied, and the AMF 220-*b* may reject access to the network slice based on determining that the criteria are not satisfied.

The criteria associated with the GST parameters may be whether the UE 115-*c* is within a coverage area for the network slice, whether a backoff timer associated with the network slice has expired, whether a session or application type has changed (e.g., to a session or application type supported by the network slice), whether a maximum number of users for the network slice has been reached, whether a maximum throughput for the network slice has been reached, etc. In these examples, the criteria may be satisfied when the UE 115-*c* is within the coverage area for the network slice, the backoff timer associated with the network slice has expired, the updated session or application type is supported by the network slice, the number of users for the network slice fails to exceed the maximum number of users, or the throughput for the network slice fails to exceed the maximum throughput.

At 415, AMF 220-*b* may send a rejected NSSAI including the S-NSSAI corresponding to the network slice to reject access to the network slice. That is, the AMF 220-*b* may send a control message indicating that access to the network slice is rejected. In the control message (or rejected NSSAI), the AMF 220-*b* may also indicate at least one condition for the UE 115-*c* to retry to access the network slice (e.g., based on the criteria used to reject access to the network slice). Thus, at, 420, UE 115-*c* may determine whether to retry to access the NSSAI based on the at least one condition. For instance, UE 115-*c* may determine whether to send a second request for access to the network slice based on the at least one condition for retrying to access the network slice. If UE 115-*c* determines that the at least one condition for retrying to access the network slice is satisfied, the UE 115-*c* may send another requested NSSAI message including the S-NSSAI of the network slice at 425. That is, the UE 115-*c* may send the second request for access to the network slice, and UE 115-*c* may receive an indication that access to the network slice is allowed (e.g., since the criteria may be satisfied when the at least one condition is satisfied).

Figure 5:
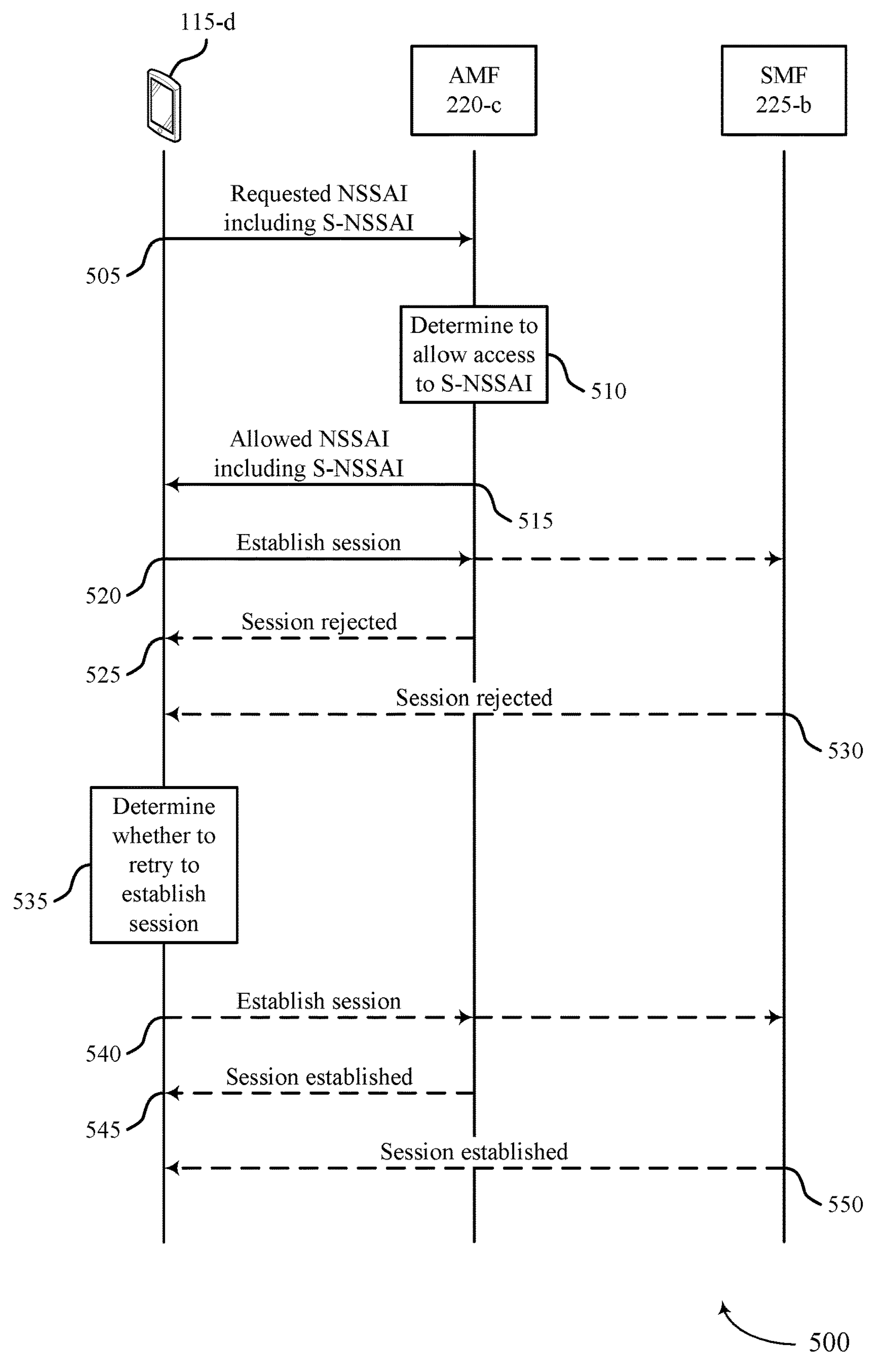

FIG. 5 illustrates an example of a process flow 500 that supports handling slice limitations in accordance with aspects of the present disclosure. The process flow 500 illustrates aspects of techniques performed by a UE 115-*d*, which may be an example of a UE 115 described with reference to FIGS. 1-3. The process flow 500 also illustrates aspects of techniques performed by an AMF 220-*c*, which may be an example of an AMF 220 described with reference to FIGS. 2 and 3. The process flow 500 also illustrates aspects of techniques performed by an SMF 225-*b*, which may be an example of an SMF 225 described with reference to FIGS. 2 and 3. As described herein, process flow 500 may support efficient techniques for handling slice limitations in consideration of GST parameters.

At 505, UE 115-*d* may send a requested NSSAI message (e.g., via a base station 105) including an S-NSSAI to AMF 220-*c* to request access to a network slice corresponding to the S-NSSAI. That is, UE 115-*d* may send a request for access to the network slice (e.g., of a set of network slices), the request including an identifier of the network slice (e.g., the S-NSSAI). At 510, AMF 220-*c* may then determine whether to allow or reject access to the network slice based on whether criteria associated with the GST parameters of the network slice are satisfied. In the example of FIG. 5, AMF 220-*b* may determine that the criteria associated with the GST parameters of the network slice are not satisfied. However, at 515, AMF 220-*c* may send an allowed NSSAI including the S-NSSAI corresponding to the network slice to allow access to the network slice. That is, the AMF 220-*c* may send a control message indicating that access to the network slice is allowed. The AMF 220-*c* may also store the criteria associated with the GST parameters that are not satisfied (e.g., to determine whether to later reject or allow a PDU session).

At 520, UE 115-*d* may then send to AMF 220-*c* (e.g., via a base station 105) a control message to establish a PDU session via the network slice corresponding to the S-NSSAI. In one example, at 525, UE 115-*d* may then receive a control message from AMF 220-*c* indicating that the PDU session is rejected. In particular, AMF 220-*c* may determine that the criteria associated with the GST parameters of the network slice are not satisfied, and AMF 220-*c* may reject the PDU session based on the criteria not being satisfied. In this example, the AMF 220-*c* may indicate a backoff timer for the network slice, and the UE 115-*d* may retry to establish the PDU session after the backoff timer expires. In another example, at 520, AMF 220-*c* may forward the control message to establish the PDU session via the network slice to SMF 225-*b*, and, at 530, UE 115-*d* may receive a control message from SMF 225-*b* indicating that the PDU session is rejected. In particular, SMF 225-*b* may determine that the criteria associated with the GST parameters of the network slice are not satisfied, and SMF 225-*b* may reject the PDU session based on the criteria not being satisfied. In this example, the SMF 225-*b* may also indicate at least one condition for the UE 115-*d* to retry to establish the PDU session (e.g., based on the criteria used to reject the PDU session).

At 535, UE 115-*d* may then determine whether to retry to establish the PDU session via the network slice based on the at least one condition (e.g., based on whether the backoff timer has expired). For instance, UE 115-*d* may determine whether to send a control message to establish the PDU session via the network slice. If UE 115-*d* determines that the at least one condition for retrying to establish the PDU session is satisfied or the backoff timer has expired, at 540, UE 115-*d* may send to AMF 220-*c* a control message to establish the PDU session via the network slice. At 545, the UE 115-*d* may then receive an indication from AMF 220-*c* that the PDU session via the network slice is successfully established. Alternatively, at 540, AMF 220-*c* may forward the control message to establish the PDU session via the network slice to SMF 225-*b*, and, at 550, the UE 115-*d* may receive an indication from SMF 225-*b* that the PDU session via the network slice is successfully established.

Figure 6:
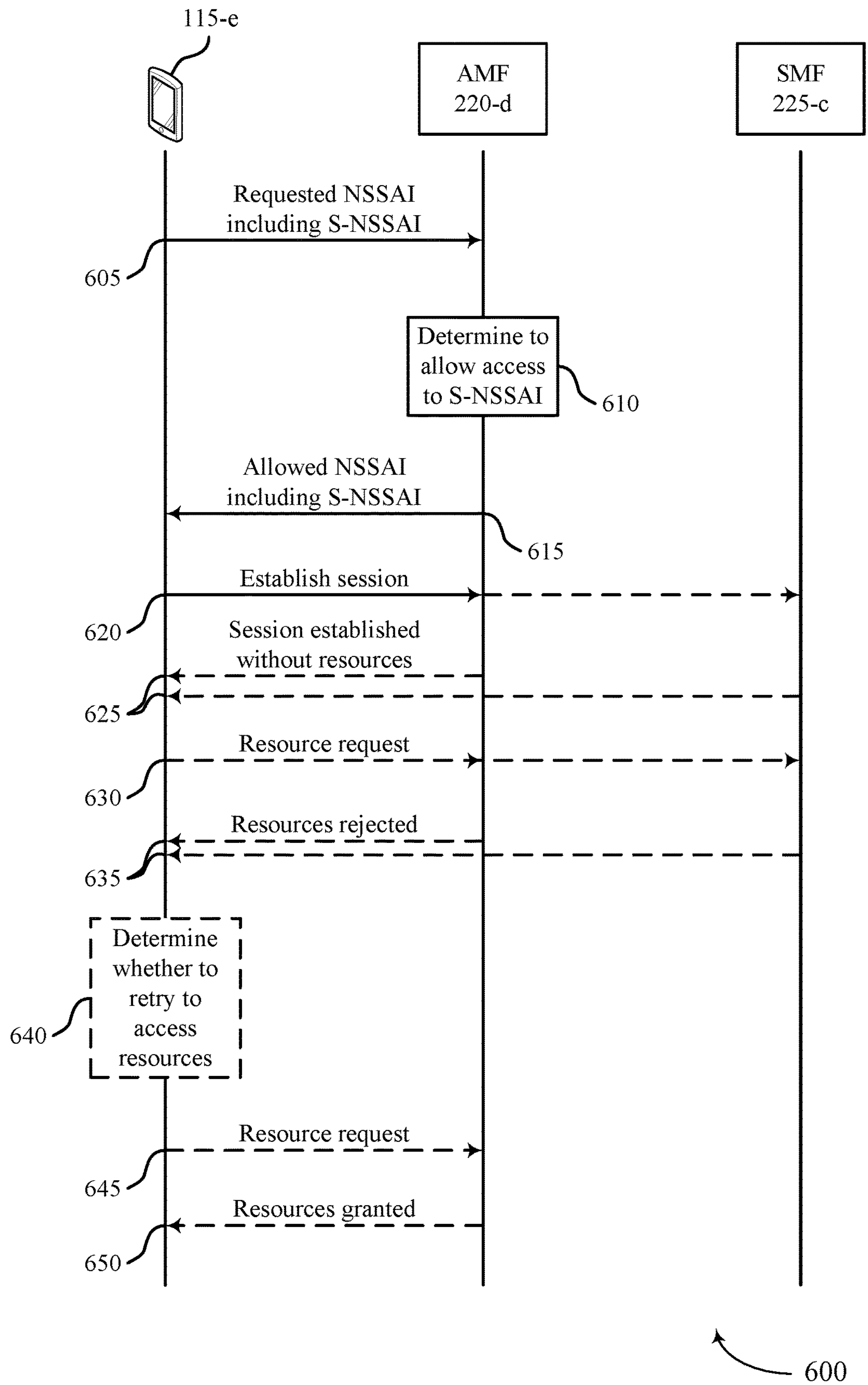

FIG. 6 illustrates an example of a process flow 600 that supports handling slice limitations in accordance with aspects of the present disclosure. The process flow 600 illustrates aspects of techniques performed by a UE 115-*e*, which may be an example of a UE 115 described with reference to FIGS. 1-3. The process flow 600 also illustrates aspects of techniques performed by an AMF 220-*d*, which may be an example of an AMF 220 described with reference to FIGS. 2 and 3. The process flow 600 also illustrates aspects of techniques performed by an SMF 225-*c*, which may be an example of an SMF 225 described with reference to FIGS. 2 and 3. As described herein, process flow 600 may support efficient techniques for handling slice limitations in consideration of GST parameters.

At 605, UE 115-*c* may send a requested NSSAI message (e.g., via a base station 105) including an S-NSSAI to AMF 220-*d* to request access to a network slice corresponding to the S-NSSAI. That is, UE 115-*e* may send a request for access to the network slice (e.g., of a set of network slices), the request including an identifier of the network slice (e.g., the S-NSSAI). At 610, AMF 220-*d* may then determine whether to allow or reject access to the network slice based on whether criteria associated with the GST parameters of the network slice are satisfied. In the example of FIG. 6, AMF 220-*d* may determine to allow access to the network slice corresponding to the S-NSSAI (e.g., irrespective of whether criteria associated with GST parameters of the network slice are satisfied). At 615, AMF 220-*d* may send an allowed NSSAI including the S-NSSAI corresponding to the network slice to allow access to the network slice. That is, AMF 220-*d* may send a control message indicating that access to the network slice is allowed.

At 620, UE 115-*c* may then send to AMF 220-*d* (e.g., via a base station 105) a control message to establish a PDU session via the network slice corresponding to the S-NSSAI. In one example, at 625, UE 115-*e* may receive an indication from AMF 220-*d* that the PDU session via the network slice is successfully established without resources. In another example, at 620, AMF 220-*d* may forward the control message to establish the PDU session via the network slice to SMF 225-*c*, and, at 625, UE 115-*c* may receive an indication from SMF 225-*c* that the PDU session via the network slice is successfully established without resources. That is, UE 115-*e* may establish a PDU session via the network slice for communicating with a base station 105 (e.g., irrespective of whether criteria associated with GST parameters of the network slice are satisfied). However, the PDU session may be established without resources (e.g., access to user plane resources may be blocked by AMF 220-*d* or SMF 225-*c*). If AMF 220-*d* decides to allow access to the network slice and allow the UE 115-*e* to establish the PDU session without resources, when the AMF 220-*d* forwards the control message to establish the PDU session (e.g., the PDU session request) to the SMF 225-*c*, the AMF 220-*d* may include an indication that the network slice is restricted or no resources are allowed. As such, the SMF 225-*c* may avoid sending an N2 container (or QoS resource descriptor or user plane descriptor) to the RAN via the AMF 220-*d*, and no resources may be established for the PDU session. Alternatively, the SMF 225-*c* may send the N2 container to the AMF 220-*d*, and the AMF 220-*d* may avoid forwarding the N2 container to the RAN.

In some examples, at 630, UE 115-*e* may send a request for resources (e.g., service request) for communicating with the base station 105 via the established PDU session (e.g., to a base station 105, where the request may be forwarded to SMF 225-*c* or AMF 220-*d*). At 635, UE 115-*e* may then receive a control message indicating that access to the resources is rejected (e.g., from the SMF 225-*c* or the AMF 220-*d*). In particular, the SMF 225-*c* or AMF 220-*d* may identify that the UE 115-*e* is attempting to gain access to the resources and may determine to reject access to the resources based on GST parameters of the network slice (e.g., whether criteria associated with the GST parameters of the network slice are satisfied).

In some cases, the control message used to reject access to the resources may indicate at least one condition for the UE 115-*e* to retry to access the resources for communicating with the base station 105. Thus, at 640, UE 115-*e* may determine whether to retry to access the resources based on the at least one condition. In particular, if the at least one condition is satisfied, at 645, the UE 115-*e* may send another request for the resources for communicating with the base station 105 via the established PDU session, and, at 650, UE 115-*e* may receive an indication that the resources are granted for communicating with the base station 105 (e.g., since the criteria may be satisfied when the at least one condition is satisfied).

Figure 7:
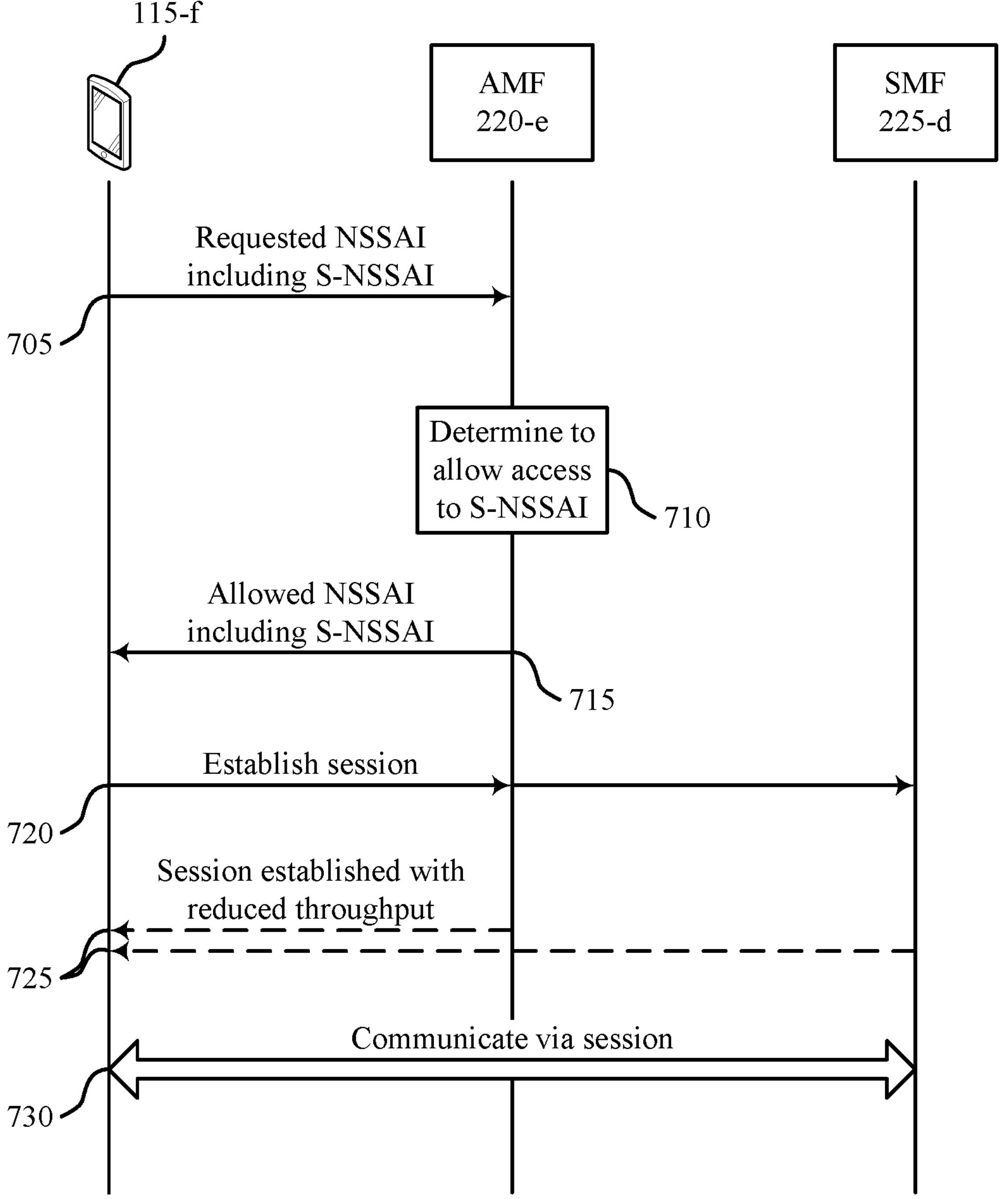

FIG. 7 illustrates an example of a process flow 700 that supports handling slice limitations in accordance with aspects of the present disclosure. The process flow 700 illustrates aspects of techniques performed by a UE 115-*f*, which may be an example of a UE 115 described with reference to FIGS. 1-3. The process flow 700 also illustrates aspects of techniques performed by an AMF 220-*e*, which may be an example of an AMF 220 described with reference to FIGS. 2 and 3. The process flow 700 also illustrates aspects of techniques performed by an SMF 225-*d*, which may be an example of an SMF 225 described with reference to FIGS. 2 and 3. As described herein, process flow 700 may support efficient techniques for handling slice limitations in consideration of GST parameters.

At 705, UE 115-*f* may send a requested NSSAI message (e.g., via a base station 105) including an S-NSSAI to AMF 220-*e* to request access to a network slice corresponding to the S-NSSAI that is associated with a first throughput (e.g., first QoS). That is, UE 115-*f* may send a request for access to the network slice (e.g., of a set of network slices), the request including an identifier of the network slice (i.e., the S-NSSAI), and the network slice associated with the first throughput. At 710, AMF 220-*c* may then determine whether to allow or reject access to the network slice based on whether criteria associated with the GST parameters of the network slice are satisfied. In the example of FIG. 7, AMF 220-*e* may determine to allow access to the network slice corresponding to the S-NSSAI (e.g., irrespective of whether criteria associated with GST parameters of the network slice are satisfied). At 715, AMF 220-*e* may send an allowed NSSAI including the S-NSSAI corresponding to the network slice to allow access to the network slice. That is, AMF 220-*e* may send a control message indicating that access to the network slice is allowed.

At 720, UE 115-*f* may then send to AMF 220-*e* a control message to establish a PDU session via the network slice corresponding to the S-NSSAI. In one example, at 725, UE 115-*f* may receive an indication from AMF 220-*e* that the PDU session via the network slice is successfully established with a second, reduced throughput (e.g., a second, lower QoS). In another example, at 720, AMF 220-*e* may forward the control message to establish the PDU session via the network slice to SMF 225-*d*, and, at 725, UE 115-*f* may receive an indication from SMF 225-*d* that the PDU session via the network slice is successfully established with the second, reduced throughput. For example, SMF 225-*d* may determine that criteria associated with GST parameters of the network slice are not satisfied (e.g., throughput for the network slice is above a threshold), and SMF 225-*d* may establish the PDU session with the second, reduced throughput based on determining that the criteria associated with the GST parameters of the network slice are not satisfied. At 730, UE 115-*f* may then communicate via the PDU session in accordance with the second, reduced throughput.

Figure 8:
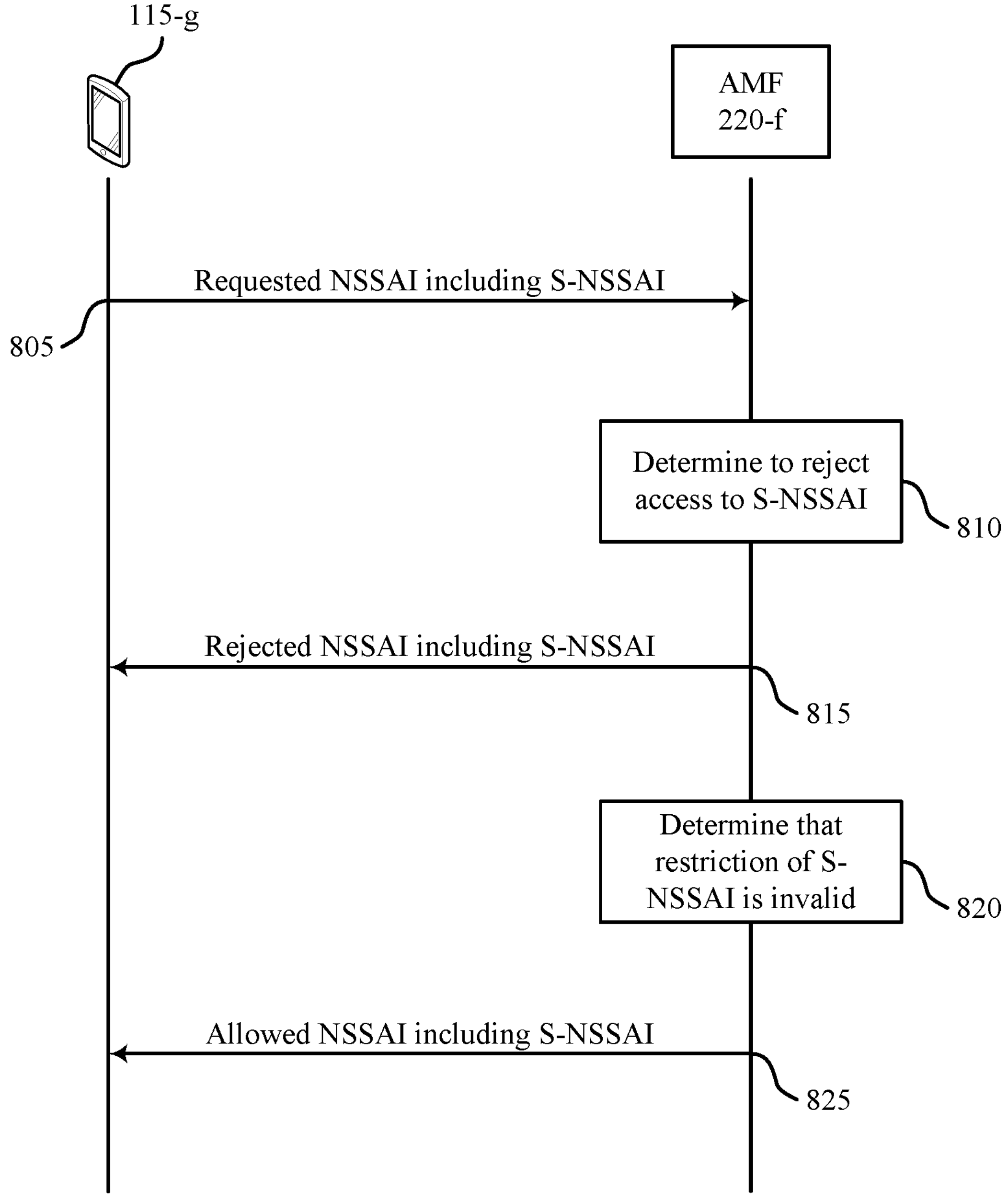

FIG. 8 illustrates an example of a process flow 800 that supports handling slice limitations in accordance with aspects of the present disclosure. The process flow 800 illustrates aspects of techniques performed by a UE 115-*g*, which may be an example of a UE 115 described with reference to FIGS. 1-3. The process flow 800 also illustrates aspects of techniques performed by an AMF 220-*f*, which may be an example of an AMF 220 described with reference to FIGS. 2 and 3. As described herein, process flow 800 may support efficient techniques for handling slice limitations in consideration of GST parameters.

At 805, UE 115-*g* may send a requested NSSAI including an S-NSSAI to AMF 220-*f* to request access to a network slice corresponding to the S-NSSAI. That is, UE 115-*g* may send a request for access to the network slice (e.g., of a set of network slices), the request including an identifier of the network slice (i.e., the S-NSSAI). At 810, AMF 220-*f* may then determine whether to allow or reject access to the network slice based on whether criteria associated with the GST parameters of the network slice are satisfied. In the example of FIG. 8, the AMF 220-*f* may determine to reject access to the network slice corresponding to the S-NSSAI based on the criteria associated with the GST parameters of the network slice. For instance, the AMF 220-*f* may determine that the criteria associated with the GST parameters of the network slice are not satisfied, and the AMF 220-*f* may reject access to the network slice based on determining that the criteria are not satisfied.

At 815, AMF 220-*f* may send a rejected NSSAI message including the S-NSSAI corresponding to the network slice to reject access to the network slice. That is, the AMF 220-*f* may send a control message to UE 115-*g* (e.g., via a base station 105) indicating that access to the network slice is rejected. In some cases, the AMF 220-*f* may also store the criteria used to determine to reject access to the network slice based on the GST parameters of the network slice. The GST parameters used to determine to reject access to the network slice may or may not overlap with the GST parameters for which the AMF 220-*f* may indicate conditions for the UE 115-*g* to retry to access the network slice. That is, the AMF 220-*f* may monitor the same or different conditions for determining whether access to the network slice is to be allowed. In any case, at 820, AMF 220-*f* may determine that a restriction or rejection of access to the network slice (e.g., determined at 810) may be invalid. For instance, the AMF 220-*f* may determine that the restriction or rejection is invalid based on the stored criteria used to determine to reject access to the network slice or based on GST parameters of the network slice changing. Thus, at 825, AMF 220-*f* may send an allowed NSSAI message to UE 115-*g* (e.g., via a base station 105) including the S-NSSA corresponding to the network slice to allow access to the network slice based on determining that the restriction or rejection is invalid.

Figure 9:
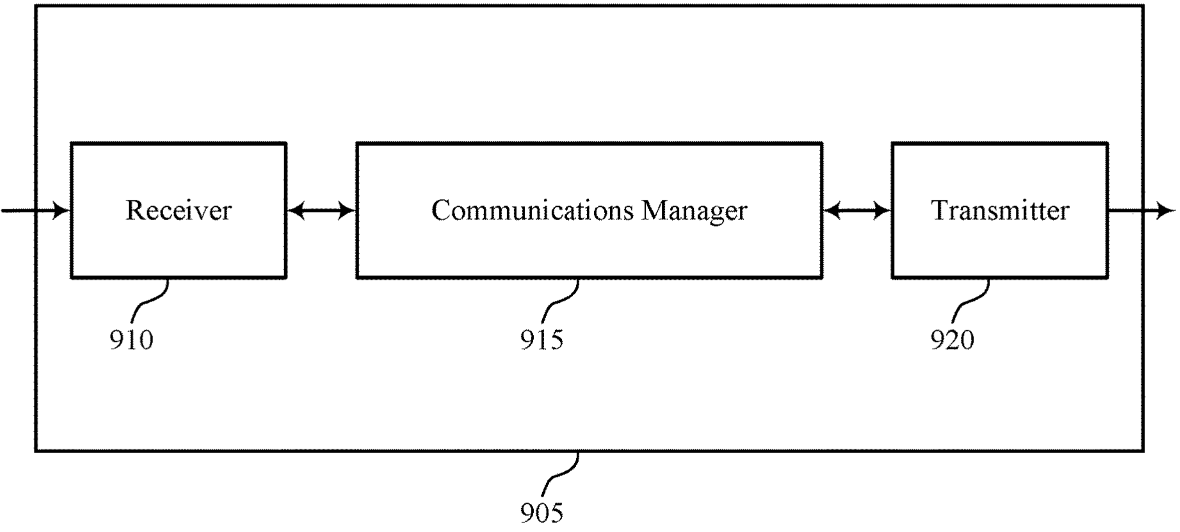
FIGS. 9 and 10 show block diagrams of devices that support handling slice limitations in accordance with aspects of the present disclosure.

FIG. 9 shows a block diagram 900 of a device 905 that supports handling slice limitations in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to handling slice limitations, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may be implemented as an integrated circuit or chipset for the device 905, and the receiver 910 and the transmitter 920 may be implemented as analog components (for example, amplifiers, filters, antennas) coupled with the device 905 modem to enable wireless transmission and reception. The actions performed by the communications manager 915 as described herein may be implemented to realize one or more potential advantages. At least one implementation may enable the communications manager 915 to handle slice limitations while limiting power consumption at the device 905.

The communications manager 915 may send, to a network entity, a first request for access to a network slice of a set of network slices, the first request including an identifier of the network slice, receive, from the network entity, a first control message indicating that access to the network slice is rejected and indicating at least one condition for retrying to access the network slice, and determine whether to send a second request for access to the network slice based on the at least one condition for retrying to access the network slice.

The communications manager 915 may also send, to a first network entity, a request for access to a network slice of a set of network slices, the request including an identifier of the network slice, receive, from the first network entity, a control message indicating that access to the network slice is allowed, send, to a second network entity, a first control message to establish a session via the network slice, receive, from the first network entity or the second network entity, a second control message indicating that the session is rejected, and identify, in the second control message, at least one condition for retrying to establish the session via the network slice.

The communications manager 915 may also send, to a network entity, a request for access to a network slice of a set of network slices, the request including an identifier of the network slice, receive, from the network entity, a first control message indicating that access to the network slice is allowed, establish a session via the network slice for communicating with a base station, send, to the base station, a request for resources for communicating with the base station via the session, and receive, from the base station, a second control message indicating that access to the resources is rejected.

The communications manager 915 may also send, to a first network entity, a request for access to a network slice of a set of network slices, the request including an identifier of the network slice and the network slice associated with a first throughput, receive, from the first network entity, a first control message indicating that access to the network slice is allowed, send, to a second network entity, a second control message to establish a session via the network slice for communicating with a base station, receive, from the second network entity, an indication that the session is successfully established and is associated with a second, reduced throughput, and communicate via the session in accordance with the second, reduced throughput. The communications manager 915 may be an example of aspects of the communications manager 1210 described herein.

By using the techniques described herein, one or more processors of the device 505 (for example, processor(s) controlling or incorporated with the UE communications manager 515) may experience power savings (e.g., increased battery life) since the limitations of network slices may be properly enforced. For instance, the device 505 may be able to determine when to retry to gain access to a network slice, for example, so that the device 505 may avoid repeatedly attempting to gain access to the network slice while being rejected continuously for the same cause.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
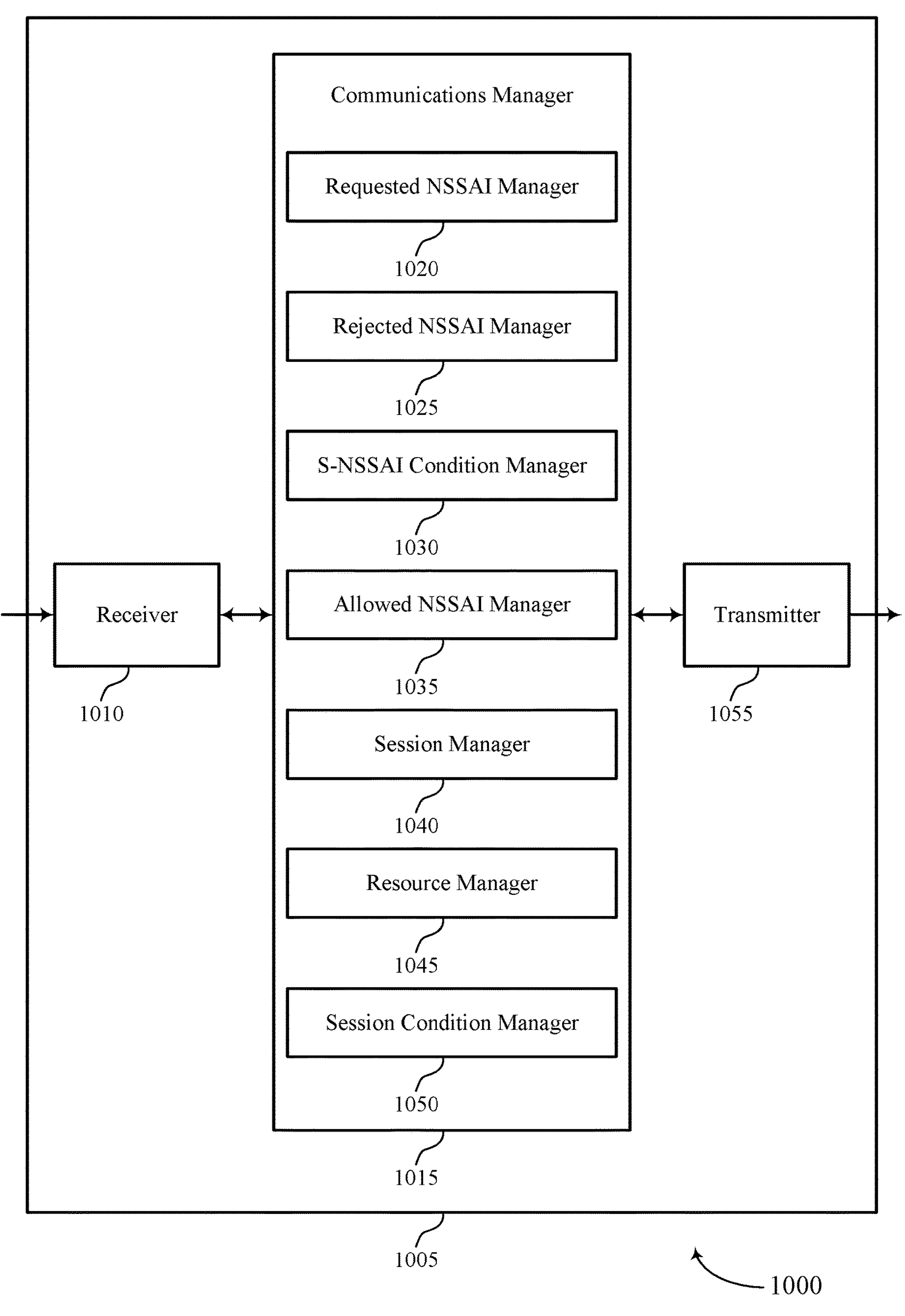

FIG. 10 shows a block diagram 1000 of a device 1005 that supports handling slice limitations in accordance with aspects of the present disclosure. The device 1005 may be an example of aspects of a device 905, or a UE 115 as described herein. The device 1005 may include a receiver 1010, a communications manager 1015, and a transmitter 1055. The device 1005 may also include a processor. Each of these components may be in communication with one another (e.g., via one or more buses).

The receiver 1010 may receive information such as packets, user data, or control information associated with various information channels (e.g., control channels, data channels, and information related to handling slice limitations, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a requested NSSAI manager 1020, a rejected NSSAI manager 1025, a S-NSSAI condition manager 1030, an allowed NSSAI manager 1035, a session manager 1040, a resource manager 1045, and a session condition manager 1050. The communications manager 1015 may be an example of aspects of the communications manager 1210 described herein.

The requested NSSAI manager 1020 may send, to a network entity, a first request for access to a network slice of a set of network slices, the first request including an identifier of the network slice. The rejected NSSAI manager 1025 may receive, from the network entity, a first control message indicating that access to the network slice is rejected and indicating at least one condition for retrying to access the network slice. The S-NSSAI condition manager 1030 may determine whether to send a second request for access to the network slice based on the at least one condition for retrying to access the network slice.

The requested NSSAI manager 1020 may send, to a first network entity, a request for access to a network slice of a set of network slices, the request including an identifier of the network slice. The allowed NSSAI manager 1035 may receive, from the first network entity, a control message indicating that access to the network slice is allowed. The session manager 1040 may send, to a second network entity, a first control message to establish a session via the network slice and receive, from the first network entity or the second network entity, a second control message indicating that the session is rejected. The session condition manager 1050 may identify, in the second control message, at least one condition for retrying to establish the session via the network slice.

The requested NSSAI manager 1020 may send, to a network entity, a request for access to a network slice of a set of network slices, the request including an identifier of the network slice. The allowed NSSAI manager 1035 may receive, from the network entity, a first control message indicating that access to the network slice is allowed. The session manager 1040 may establish a session via the network slice for communicating with a base station. The resource manager 1045 may send, to the base station, a request for resources for communicating with the base station via the session and receive, from the base station, a second control message indicating that access to the resources is rejected.

The requested NSSAI manager 1020 may send, to a first network entity, a request for access to a network slice of a set of network slices, the request including an identifier of the network slice and the network slice associated with a first throughput. The allowed NSSAI manager 1035 may receive, from the first network entity, a first control message indicating that access to the network slice is allowed. The session manager 1040 may send, to a second network entity, a second control message to establish a session via the network slice for communicating with a base station, receive, from the second network entity, an indication that the session is successfully established and is associated with a second, reduced throughput, and communicate via the session in accordance with the second, reduced throughput.

The transmitter 1055 may transmit signals generated by other components of the device 1005. In some examples, the transmitter 1055 may be collocated with a receiver 1010 in a transceiver module. For example, the transmitter 1055 may be an example of aspects of the transceiver 1220 described with reference to FIG. 12. The transmitter 1055 may utilize a single antenna or a set of antennas.

Figure 11:
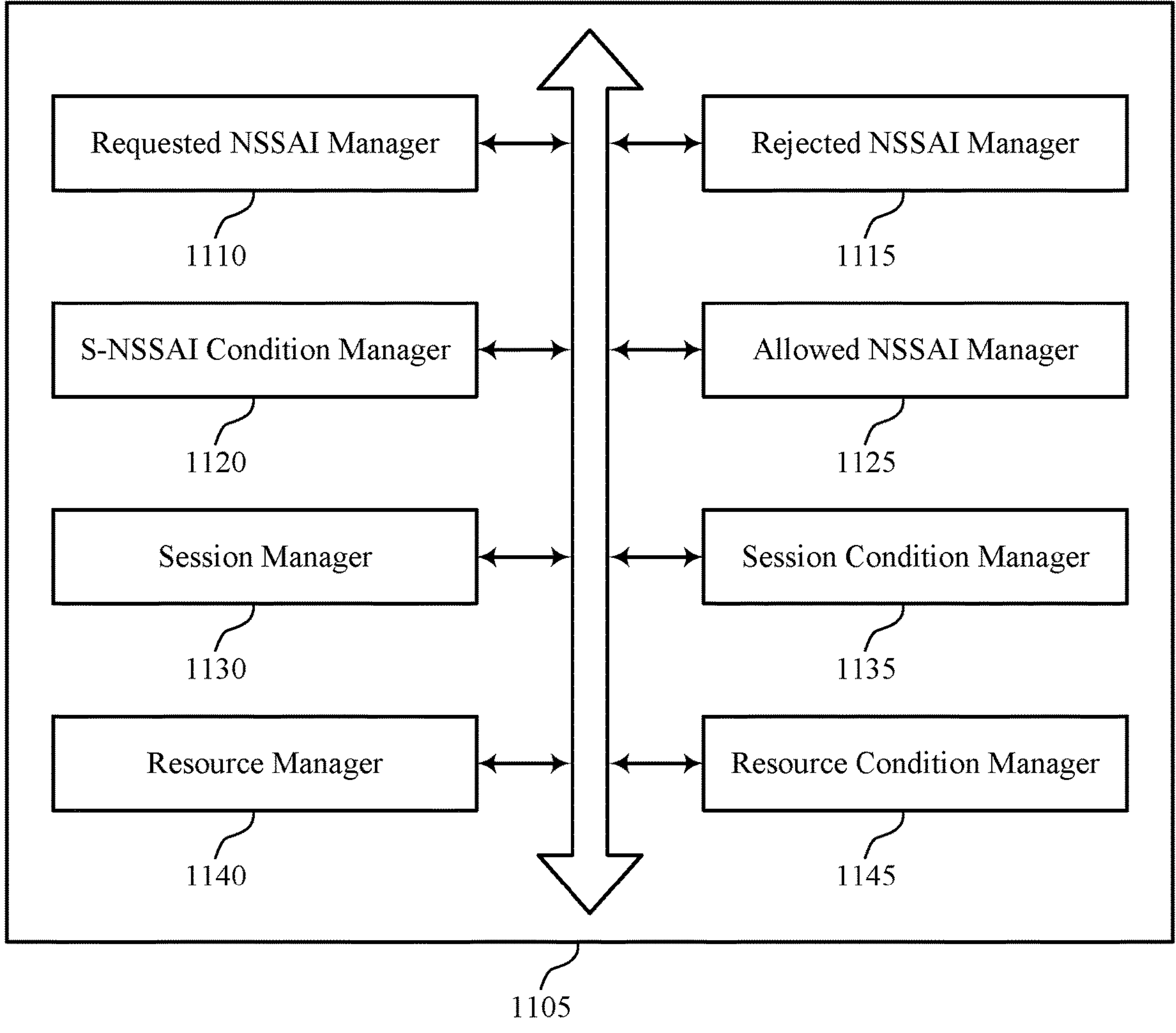
FIG. 11 shows a block diagram of a communications manager that supports handling slice limitations in accordance with aspects of the present disclosure.

FIG. 11 shows a block diagram 1100 of a communications manager 1105 that supports handling slice limitations in accordance with aspects of the present disclosure. The communications manager 1105 may be an example of aspects of a communications manager 915, a communications manager 1015, or a communications manager 1210 described herein. The communications manager 1105 may include a requested NSSAI manager 1110, a rejected NSSAI manager 1115, a S-NSSAI condition manager 1120, an allowed NSSAI manager 1125, a session manager 1130, a session condition manager 1135, a resource manager 1140, and a resource condition manager 1145. Each of these modules may communicate, directly or indirectly, with one another (e.g., via one or more buses).

The requested NSSAI manager 1110 may send, to a network entity, a first request for access to a network slice of a set of network slices, the first request including an identifier of the network slice. The rejected NSSAI manager 1115 may receive, from the network entity, a first control message indicating that access to the network slice is rejected and indicating at least one condition for retrying to access the network slice. The S-NSSAI condition manager 1120 may determine whether to send a second request for access to the network slice based on the at least one condition for retrying to access the network slice.

In some examples, the S-NSSAI condition manager 1120 may determine that the at least one condition for retrying to access the network slice is satisfied. In some examples, the requested NSSAI manager 1110 may send, to the network entity, the second request for access to the network slice. In some examples, the allowed NSSAI manager 1125 may receive, from the network entity, a second control message indicating that access to the network slice is allowed. In some cases, the at least one condition includes whether the UE is within a geographic coverage area for the network slice. In some cases, the at least one condition includes whether a backoff timer associated with the network slice has expired. In some cases, the at least one condition includes whether a session or application type has changed.

In some examples, the requested NSSAI manager 1110 may send, to a first network entity, a request for access to a network slice of a set of network slices, the request including an identifier of the network slice. The allowed NSSAI manager 1125 may receive, from the first network entity, a control message indicating that access to the network slice is allowed. The session manager 1130 may send, to a second network entity, a first control message to establish a session via the network slice. In some examples, the session manager 1130 may receive, from the first network entity or the second network entity, a second control message indicating that the session is rejected. The session condition manager 1135 may identify, in the second control message, at least one condition for retrying to establish the session via the network slice.

In some examples, the session condition manager 1135 may determine that the at least one condition for retrying to establish the session via the network slice is satisfied. In some examples, the session manager 1130 may send, to the second network entity, a third control message to establish the session via the network slice. In some examples, the session manager 1130 may receive, from the second network entity, an indication that the session via the network slice is successfully established.

In some cases, the at least one condition includes whether the UE is within a geographic coverage area for the network slice. In some cases, the at least one condition includes whether a session or application type has changed. In some cases, the at least one condition includes whether an SSC mode has changed. In some examples, the session manager 1130 may identify, in the second control message, a rejection cause for the session being rejected. In some cases, the rejection cause indicates that an SSC mode is unsupported. In some cases, the first network entity includes an access and mobility management function, and the second network entity includes a session management function.

In some examples, the requested NSSAI manager 1110 may send, to a network entity, a request for access to a network slice of a set of network slices, the request including an identifier of the network slice. In some examples, the allowed NSSAI manager 1125 may receive, from the network entity, a first control message indicating that access to the network slice is allowed. In some examples, the session manager 1130 may establish a session via the network slice for communicating with a base station. The resource manager 1140 may send, to the base station, a request for resources for communicating with the base station via the session. In some examples, the resource manager 1140 may receive, from the base station, a second control message indicating that access to the resources is rejected. In some examples, the resource manager 1140 may receive, in the second control message, an indication that access to the resources is rejected because access to the network slice is rejected. The resource condition manager 1145 may receive, in the second control message, at least one condition for retrying to access the resources for communicating with the base station via the network slice.

In some examples, the requested NSSAI manager 1110 may send, to a first network entity, a request for access to a network slice of a set of network slices, the request including an identifier of the network slice and the network slice associated with a first throughput. In some examples, the allowed NSSAI manager 1125 may receive, from the first network entity, a first control message indicating that access to the network slice is allowed. In some examples, the session manager 1130 may send, to a second network entity, a second control message to establish a session via the network slice for communicating with a base station. In some examples, the session manager 1130 may receive, from the second network entity, an indication that the session is successfully established and is associated with a second, reduced throughput. In some examples, the session manager 1130 may communicate via the session in accordance with the second, reduced throughput. In some cases, the first throughput is associated with a first quality of service and the second, reduced throughput is associated with a second, lower quality of service. In some cases, the first network entity includes an access and mobility management function, and the second network entity includes a session management function.

Figure 12:
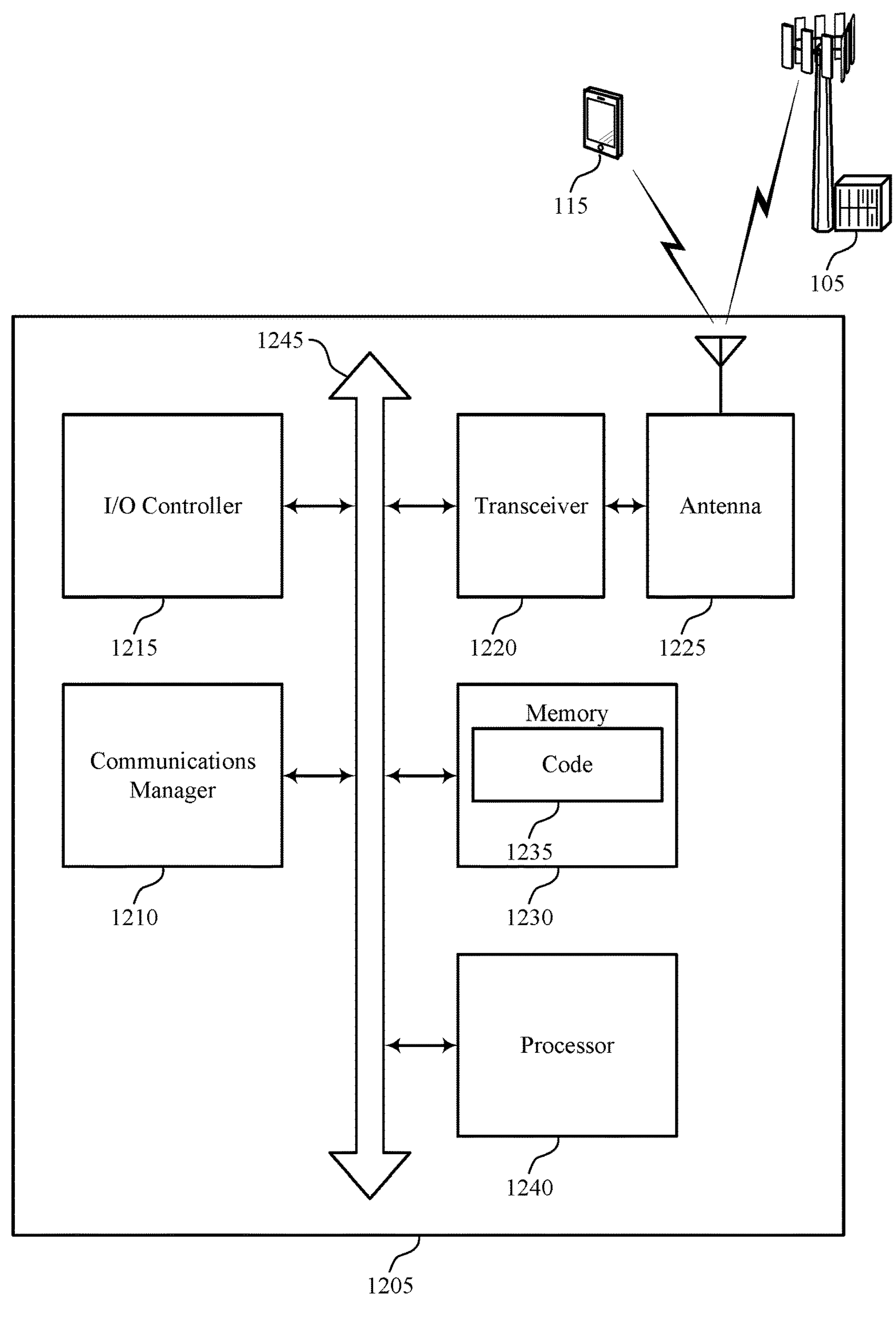
FIG. 12 shows a diagram of a system including a device that supports handling slice limitations in accordance with aspects of the present disclosure.

FIG. 12 shows a diagram of a system 1200 including a device 1205 that supports handling slice limitations in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may send, to a network entity, a first request for access to a network slice of a set of network slices, the first request including an identifier of the network slice, receive, from the network entity, a first control message indicating that access to the network slice is rejected and indicating at least one condition for retrying to access the network slice, and determine whether to send a second request for access to the network slice based on the at least one condition for retrying to access the network slice.

The communications manager 1210 may also send, to a first network entity, a request for access to a network slice of a set of network slices, the request including an identifier of the network slice, receive, from the first network entity, a control message indicating that access to the network slice is allowed, send, to a second network entity, a first control message to establish a session via the network slice, receive, from the first network entity or the second network entity, a second control message indicating that the session is rejected, and identify, in the second control message, at least one condition for retrying to establish the session via the network slice.

The communications manager 1210 may also send, to a network entity, a request for access to a network slice of a set of network slices, the request including an identifier of the network slice, receive, from the network entity, a first control message indicating that access to the network slice is allowed, establish a session via the network slice for communicating with a base station, send, to the base station, a request for resources for communicating with the base station via the session, and receive, from the base station, a second control message indicating that access to the resources is rejected.

The communications manager 1210 may also send, to a first network entity, a request for access to a network slice of a set of network slices, the request including an identifier of the network slice and the network slice associated with a first throughput, receive, from the first network entity, a first control message indicating that access to the network slice is allowed, send, to a second network entity, a second control message to establish a session via the network slice for communicating with a base station, receive, from the second network entity, an indication that the session is successfully established and is associated with a second, reduced throughput, and communicate via the session in accordance with the second, reduced throughput.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting handling slice limitations).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
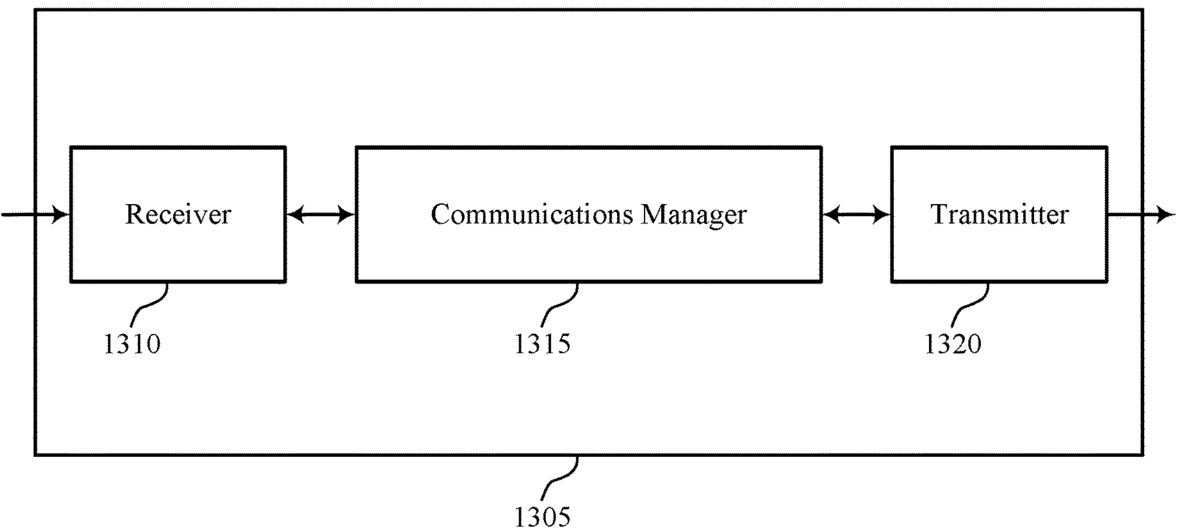
FIGS. 13 and 14 show block diagrams of devices that support handling slice limitations in accordance with aspects of the present disclosure.

FIG. 13 shows a block diagram 1300 of a device 1305 that supports handling slice limitations in accordance with aspects of the present disclosure. The device 1305 may be an example of aspects of a network entity as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to handling slice limitations, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive, from a UE, a first request for access to a network slice of a set of network slices, the first request including an identifier of the network slice, determine to reject access to the network slice based on one or more parameters associated with the network slice, and send, to the UE, a first control message indicating that access to the network slice is rejected and indicating at least one condition for retrying to access the network slice.

The communications manager 1315 may also receive, from a UE, a first control message for establishing a session via a network slice, where access to the network slice is allowed for the UE, determine to reject the session via the network slice based on one or more parameters associated with the network slice, and send, to the UE, a second control message indicating that the session is rejected and indicating at least one condition for retrying to establish the session via the network slice.

The communications manager 1315 may also identify that a UE is attempting to gain access to resources for communicating with a base station via a network slice, determine to reject access to the resources based on one or more parameters associated with the network slice, and send, to the UE, a control message indicating that access to the resources is rejected.

The communications manager 1315 may also receive, from a UE, a first control message for establishing a session via a network slice, where access to the network slice is allowed for the UE and is associated with a first throughput and send, to the UE, an indication that the session is successfully established and is associated with a second, reduced throughput based on one or more parameters associated with the network slice. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
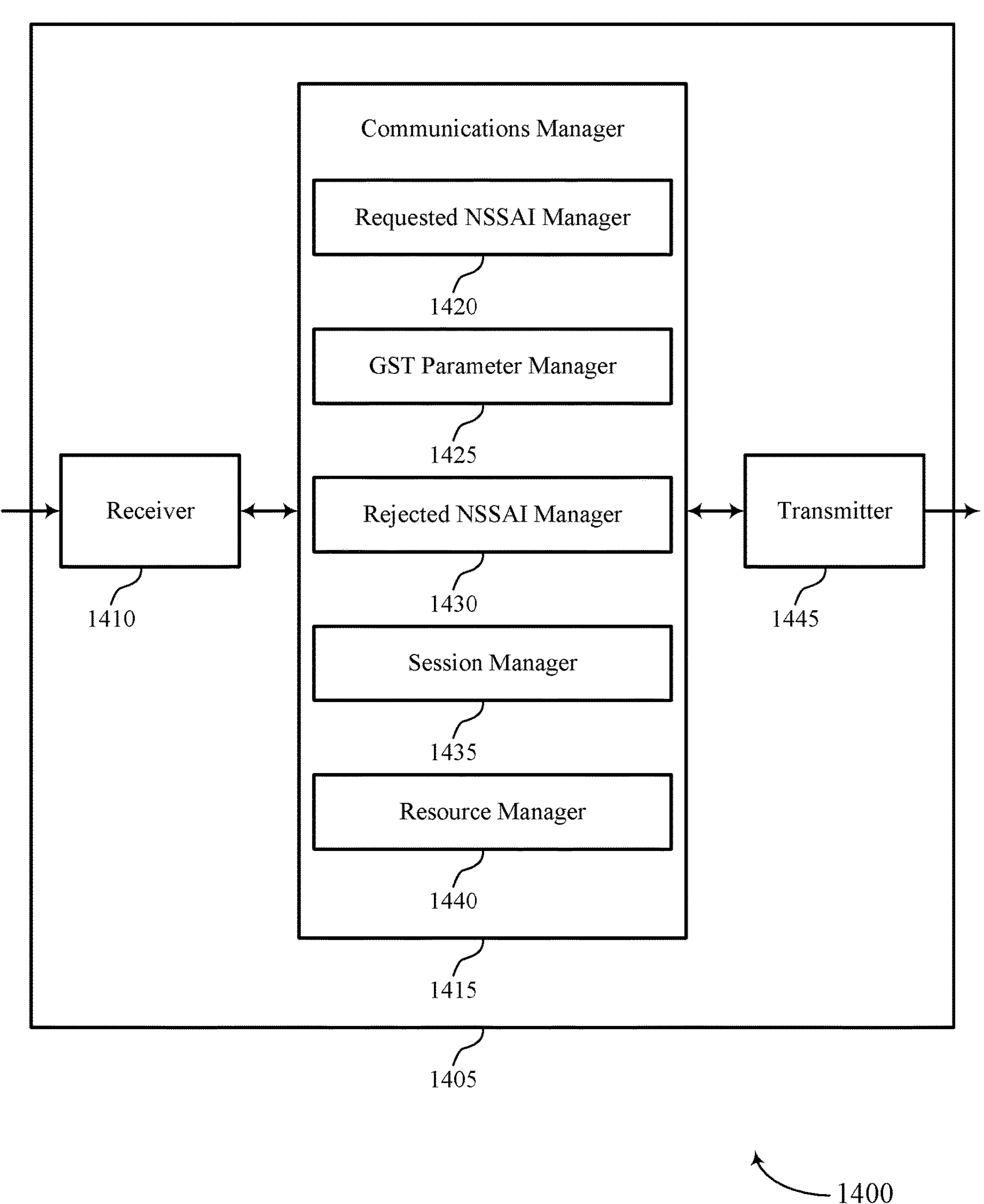

FIG. 14 shows a block diagram 1400 of a device 1405 that supports handling slice limitations in accordance with aspects of the present disclosure. The device 1405 may be an example of aspects of a device 1305 or a network entity as described herein. The device 1405 may include a receiver 1410, a communications manager 1415, and a transmitter 1445. The device 1405 may also include a processor. Each of these components may be in communication with one another (e.g., via one or more buses).

The receiver 1410 may receive information such as packets, user data, or control information associated with various information channels (e.g., control channels, data channels, and information related to handling slice limitations, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a requested NSSAI manager 1420, a GST parameter manager 1425, a rejected NSSAI manager 1430, a session manager 1435, and a resource manager 1440. The communications manager 1415 may be an example of aspects of the communications manager 1610 described herein.

The requested NSSAI manager 1420 may receive, from a UE, a first request for access to a network slice of a set of network slices, the first request including an identifier of the network slice. The GST parameter manager 1425 may determine to reject access to the network slice based on one or more parameters associated with the network slice. The rejected NSSAI manager 1430 may send, to the UE, a first control message indicating that access to the network slice is rejected and indicating at least one condition for retrying to access the network slice.

The session manager 1435 may receive, from a UE, a first control message for establishing a session via a network slice, where access to the network slice is allowed for the UE. The GST parameter manager 1425 may determine to reject the session via the network slice based on one or more parameters associated with the network slice. The session manager 1435 may send, to the UE, a second control message indicating that the session is rejected and indicating at least one condition for retrying to establish the session via the network slice.

The resource manager 1440 may identify that a UE is attempting to gain access to resources for communicating with a base station via a network slice. The GST parameter manager 1425 may determine to reject access to the resources based on one or more parameters associated with the network slice. The resource manager 1440 may send, to the UE, a control message indicating that access to the resources is rejected.

The session manager 1435 may receive, from a UE, a first control message for establishing a session via a network slice, where access to the network slice is allowed for the UE and is associated with a first throughput and send, to the UE, an indication that the session is successfully established and is associated with a second, reduced throughput based on one or more parameters associated with the network slice.

The transmitter 1445 may transmit signals generated by other components of the device 1405. In some examples, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

Figure 15:
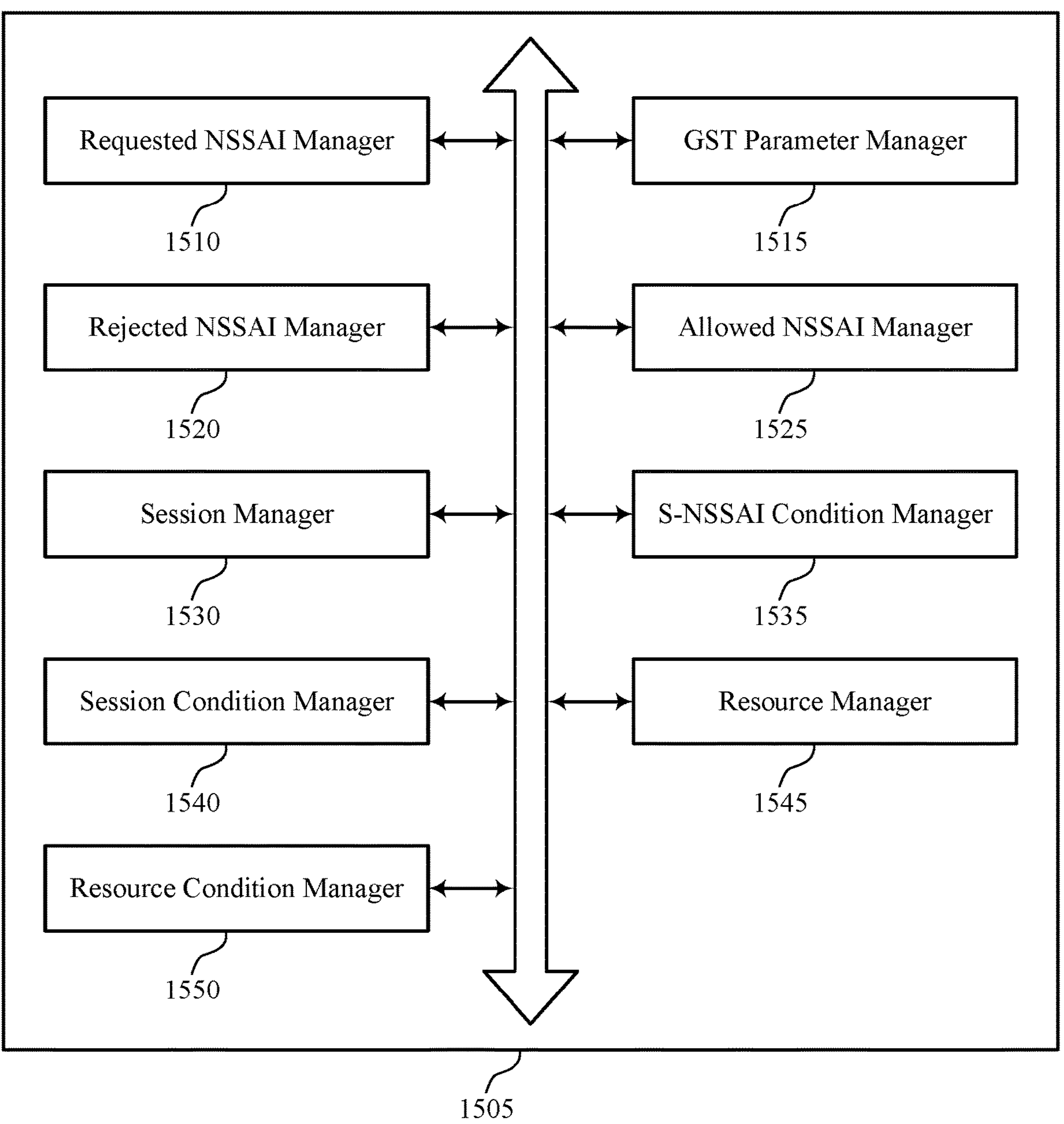
FIG. 15 shows a block diagram of a communications manager that supports handling slice limitations in accordance with aspects of the present disclosure.

FIG. 15 shows a block diagram 1500 of a communications manager 1505 that supports handling slice limitations in accordance with aspects of the present disclosure. The communications manager 1505 may be an example of aspects of a communications manager 1315, a communications manager 1415, or a communications manager 1610 described herein. The communications manager 1505 may include a requested NSSAI manager 1510, a GST parameter manager 1515, a rejected NSSAI manager 1520, an allowed NSSAI manager 1525, a session manager 1530, a S-NSSAI condition manager 1535, a session condition manager 1540, a resource manager 1545, and a resource condition manager 1550. Each of these modules may communicate, directly or indirectly, with one another (e.g., via one or more buses).

The requested NSSAI manager 1510 may receive, from a UE, a first request for access to a network slice of a set of network slices, the first request including an identifier of the network slice. The GST parameter manager 1515 may determine to reject access to the network slice based on one or more parameters associated with the network slice. The rejected NSSAI manager 1520 may send, to the UE, a first control message indicating that access to the network slice is rejected and indicating at least one condition for retrying to access the network slice.

In some examples, the requested NSSAI manager 1510 may receive, from the UE, a second request for access to the network slice based on the at least one condition for retrying to access the network slice, the second request including the identifier of the network slice. In some examples, the GST parameter manager 1515 may determine to allow access to the network slice based on the one or more parameters associated with the network slice. The allowed NSSAI manager 1525 may send, to the UE, a second control message indicating that access to the network slice is allowed.

In some examples, the GST parameter manager 1515 may store at least one criterion used to determine to reject access to the network slice based on the one or more parameters associated with the network slice or based on other parameters associated with the network slice. In some examples, the GST parameter manager 1515 may determine that the at least one criterion used to determine to reject access to the network slice is invalid. In some examples, the allowed NSSAI manager 1525 may send, to the UE, a third control message indicating that access to the network slice is allowed. In some cases, the at least one condition includes whether the UE is within a geographic coverage area for the network slice. In some cases, the at least one condition includes whether a backoff timer associated with the network slice has expired. In some cases, the at least one condition includes whether a session or application type has changed. In some cases, the one or more parameters include GST parameters.

The session manager 1530 may receive, from a UE, a first control message for establishing a session via a network slice, where access to the network slice is allowed for the UE. In some examples, the GST parameter manager 1515 may determine to reject the session via the network slice based on one or more parameters associated with the network slice. In some examples, the session manager 1530 may send, to the UE, a second control message indicating that the session is rejected and indicating at least one condition for retrying to establish the session via the network slice.

In some examples, the requested NSSAI manager 1510 may receive, from the UE, a request for access to the network slice of a set of network slices, the request including an identifier of the network slice. In some examples, the GST parameter manager 1515 may determine that at least one criterion of the one or more parameters associated with the network slice is not satisfied. In some examples, the allowed NSSAI manager 1525 may send, to the UE, a third control message indicating that access to the network slice is allowed. The S-NSSAI condition manager 1535 may store the at least one criterion to use to determine to reject the session via the network slice based on determining that the at least one criterion of the one or more parameters associated with the network slice is not satisfied.

In some examples, the session manager 1530 may receive, from the UE, a third control message for establishing the session via the network slice based on the at least one condition for retrying to establish the session via the network slice. In some examples, the GST parameter manager 1515 may determine to allow the session via the network slice based on the one or more parameters associated with the network slice. In some examples, the session manager 1530 may send, to the UE, an indication that the session via the network slice is successfully established.

In some cases, the at least one condition includes whether the UE is within a geographic coverage area for the network slice. In some cases, the at least one condition comprises whether a session or application type has changed. In some cases, the at least one condition comprises whether an SSC mode has changed. The session manager 1530 may send, in the second control message, a rejection cause for the session being rejected. In some cases, the rejection cause indicates that an SSC mode is unsupported.

The resource manager 1545 may identify that a UE is attempting to gain access to resources for communicating with a base station via a network slice. In some examples, the GST parameter manager 1515 may determine to reject access to the resources based on one or more parameters associated with the network slice. In some examples, the resource manager 1545 may send, to the UE, a control message indicating that access to the resources is rejected. In some examples, the resource manager 1545 may send, in the control message, an indication that access to the resources is rejected because access to the network slice is rejected. The resource condition manager 1550 may send, in the control message, at least one condition for retrying to access the resources for communicating with the base station via the network slice.

In some examples, the session manager 1530 may receive, from a UE, a first control message for establishing a session via a network slice, where access to the network slice is allowed for the UE and is associated with a first throughput. In some examples, the session manager 1530 may send, to the UE, an indication that the session is successfully established and is associated with a second, reduced throughput based on one or more parameters associated with the network slice. In some cases, the first throughput is associated with a first quality of service and the second, reduced throughput is associated with a second, lower quality of service. In some cases, the network entity is a session management function.

Figure 16:
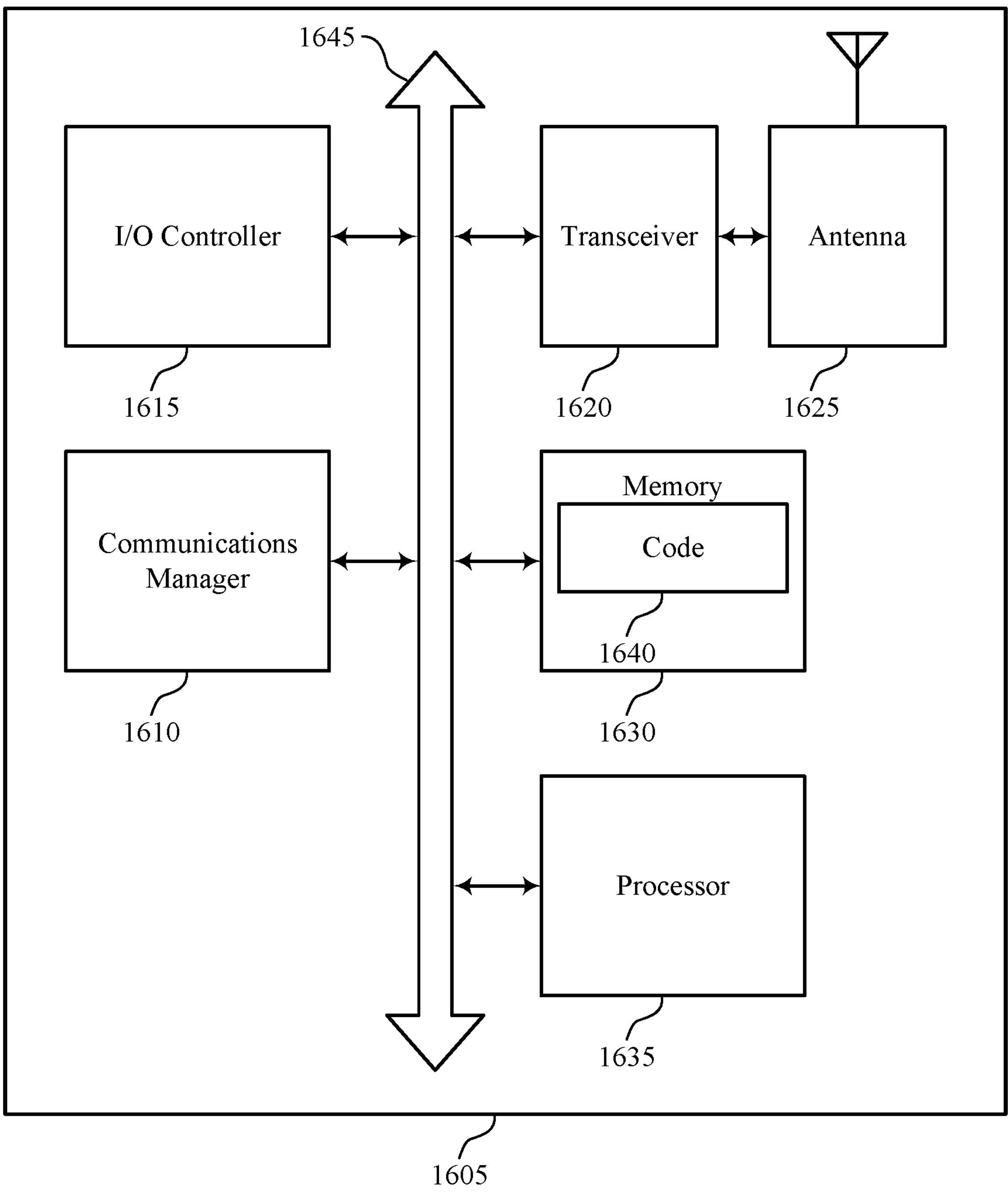
FIG. 16 shows a diagram of a system including a device that supports handling slice limitations in accordance with aspects of the present disclosure.

FIG. 16 shows a diagram of a system 1600 including a device 1605 that supports handling slice limitations in accordance with aspects of the present disclosure. The device 1605 may be an example of or include the components of device 1305, device 1405, or a network entity as described herein. The device 1605 may include components for bi-directional voice and data communications including components for transmitting and receiving communications, including a communications manager 1610, an I/O controller 1615, a transceiver 1620, an antenna 1625, memory 1630, and a processor 1635. These components may be in electronic communication via one or more buses (e.g., bus 1645).

The communications manager 1610 may receive, from a UE, a first request for access to a network slice of a set of network slices, the first request including an identifier of the network slice, determine to reject access to the network slice based on one or more parameters associated with the network slice, and send, to the UE, a first control message indicating that access to the network slice is rejected and indicating at least one condition for retrying to access the network slice.

The communications manager 1610 may also receive, from a UE, a first control message for establishing a session via a network slice, where access to the network slice is allowed for the UE, determine to reject the session via the network slice based on one or more parameters associated with the network slice, and send, to the UE, a second control message indicating that the session is rejected and indicating at least one condition for retrying to establish the session via the network slice.

The communications manager 1610 may also identify that a UE is attempting to gain access to resources for communicating with a base station via a network slice, send, to the UE, a control message indicating that access to the resources is rejected, and determine to reject access to the resources based on one or more parameters associated with the network slice.

The communications manager 1610 may also receive, from a UE, a first control message for establishing a session via a network slice, where access to the network slice is allowed for the UE and is associated with a first throughput and send, to the UE, an indication that the session is successfully established and is associated with a second, reduced throughput based on one or more parameters associated with the network slice.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM and ROM. The memory 1630 may store computer-readable, computer-executable code 1640 including instructions that, when executed, cause the processor to perform various functions described herein. In some cases, the memory 1630 may contain, among other things, a BIOS which may control basic hardware or software operation such as the interaction with peripheral components or devices.

The processor 1635 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1635 may be configured to operate a memory array using a memory controller. In other cases, a memory controller may be integrated into the processor 1635. The processor 1635 may be configured to execute computer-readable instructions stored in a memory (e.g., the memory 1630) to cause the device 1605 to perform various functions (e.g., functions or tasks supporting handling slice limitations).

The code 1640 may include instructions to implement aspects of the present disclosure, including instructions to support wireless communications. The code 1640 may be stored in a non-transitory computer-readable medium such as system memory or other type of memory. In some cases, the code 1640 may not be directly executable by the processor 1635 but may cause a computer (e.g., when compiled and executed) to perform functions described herein.

Figure 17:
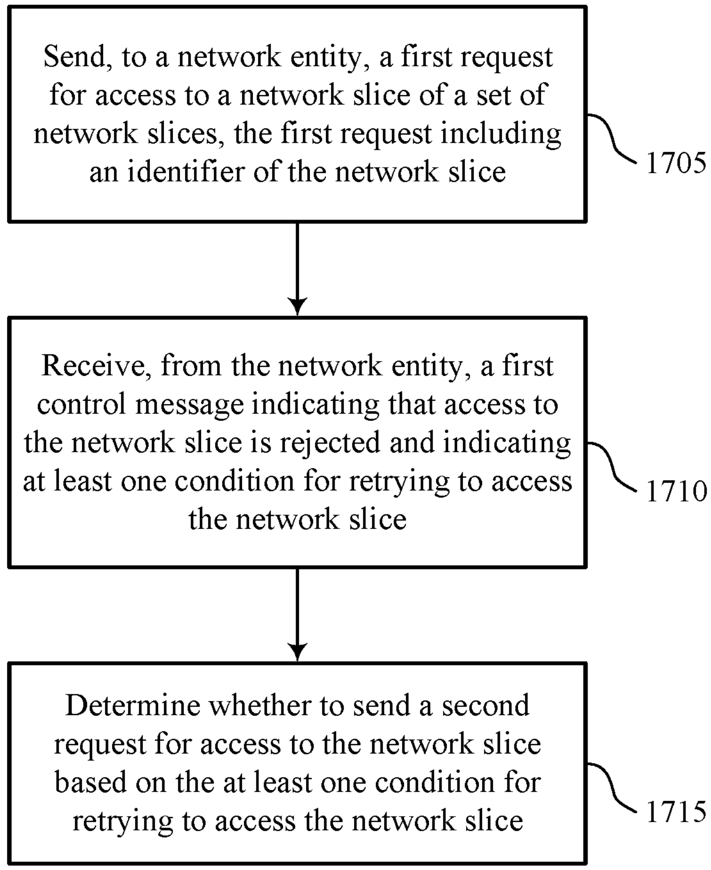
FIGS. 17 through 24 show flowcharts illustrating methods that support handling slice limitations in accordance with aspects of the present disclosure.

FIG. 17 shows a flowchart illustrating a method 1700 that supports handling slice limitations in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1705, the UE may send, to a network entity, a first request for access to a network slice of a set of network slices, the first request including an identifier of the network slice. The operations of 1705 may be performed according to the methods described herein. In some examples, aspects of the operations of 1705 may be performed by a requested NSSAI manager as described with reference to FIGS. 9 through 12.

At 1710, the UE may receive, from the network entity, a first control message indicating that access to the network slice is rejected and indicating at least one condition for retrying to access the network slice. The operations of 1710 may be performed according to the methods described herein. In some examples, aspects of the operations of 1710 may be performed by a rejected NSSAI manager as described with reference to FIGS. 9 through 12.

At 1715, the UE may determine whether to send a second request for access to the network slice based on the at least one condition for retrying to access the network slice. The operations of 1715 may be performed according to the methods described herein. In some examples, aspects of the operations of 1715 may be performed by a S-NSSAI condition manager as described with reference to FIGS. 9 through 12.

Figure 18:
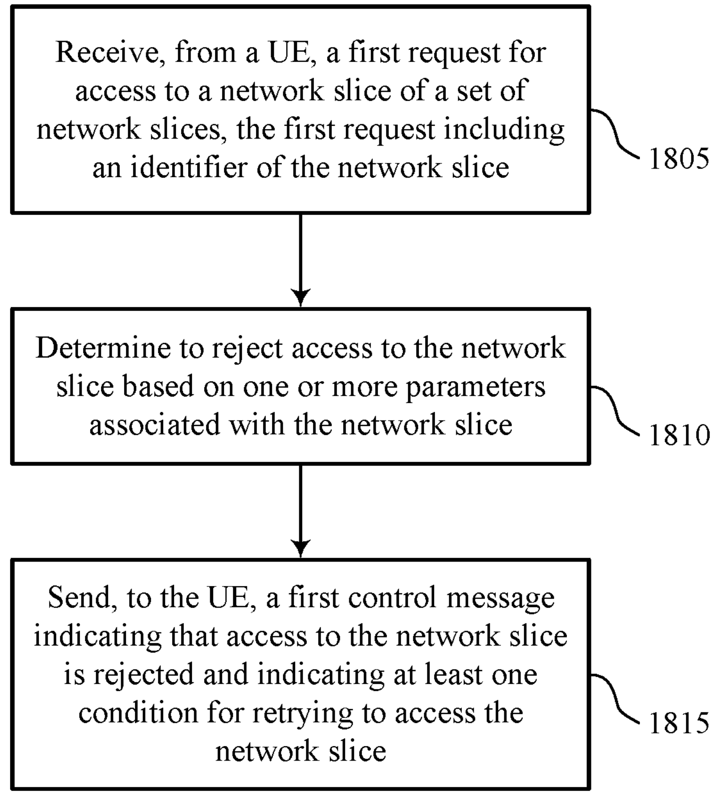

FIG. 18 shows a flowchart illustrating a method 1800 that supports handling slice limitations in accordance with aspects of the present disclosure. The operations of method 1800 may be implemented by a network entity or its components as described herein. For example, the operations of method 1800 may be performed by a communications manager as described with reference to FIGS. 13 through 16. In some examples, a network entity may execute a set of instructions to control the functional elements of the network entity to perform the functions described below. Additionally, or alternatively, a network entity may perform aspects of the functions described below using special-purpose hardware.

At 1805, the network entity may receive, from a UE, a first request for access to a network slice of a set of network slices, the first request including an identifier of the network slice. The operations of 1805 may be performed according to the methods described herein. In some examples, aspects of the operations of 1805 may be performed by a requested NSSAI manager as described with reference to FIGS. 13 through 16.

At 1810, the network entity may determine to reject access to the network slice based on one or more parameters associated with the network slice. The operations of 1810 may be performed according to the methods described herein. In some examples, aspects of the operations of 1810 may be performed by a GST parameter manager as described with reference to FIGS. 13 through 16.

At 1815, the network entity may send, to the UE, a first control message indicating that access to the network slice is rejected and indicating at least one condition for retrying to access the network slice. The operations of 1815 may be performed according to the methods described herein. In some examples, aspects of the operations of 1815 may be performed by a rejected NSSAI manager as described with reference to FIGS. 13 through 16.

Figure 19:
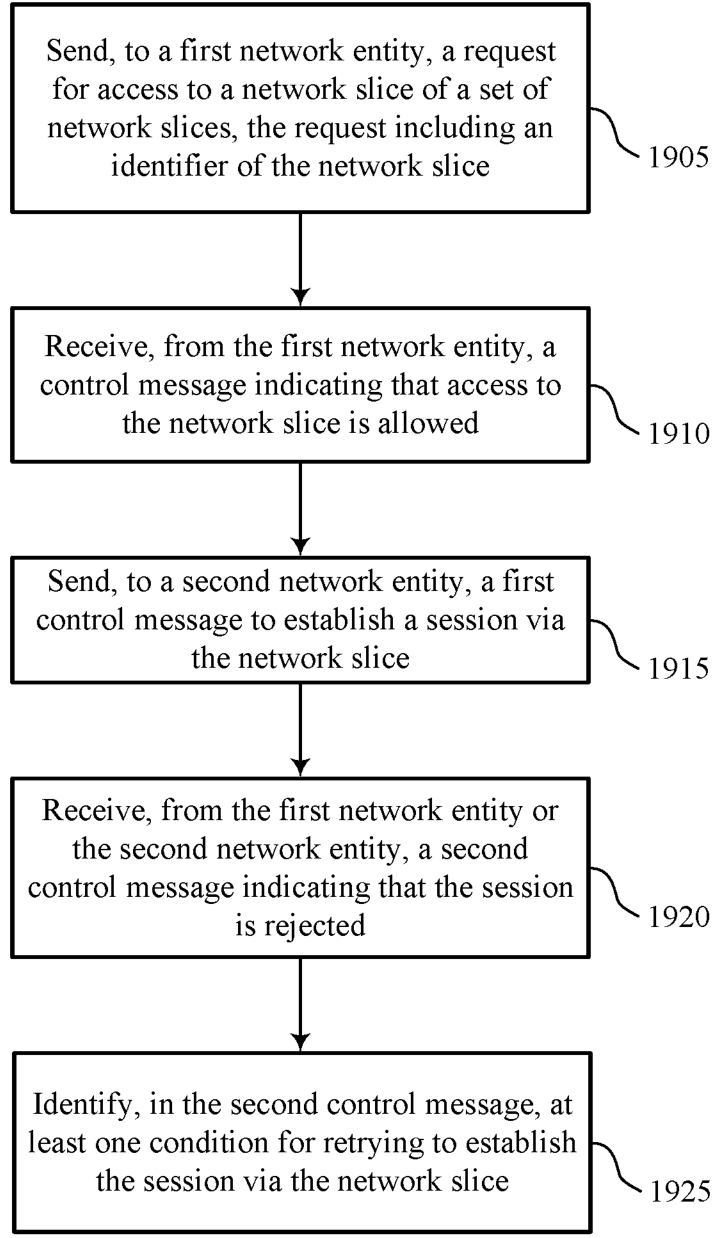

FIG. 19 shows a flowchart illustrating a method 1900 that supports handling slice limitations in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1905, the UE may send, to a first network entity, a request for access to a network slice of a set of network slices, the request including an identifier of the network slice. The operations of 1905 may be performed according to the methods described herein. In some examples, aspects of the operations of 1905 may be performed by a requested NSSAI manager as described with reference to FIGS. 9 through 12.

At 1910, the UE may receive, from the first network entity, a control message indicating that access to the network slice is allowed. The operations of 1910 may be performed according to the methods described herein. In some examples, aspects of the operations of 1910 may be performed by an allowed NSSAI manager as described with reference to FIGS. 9 through 12.

At 1915, the UE may send, to a second network entity, a first control message to establish a session via the network slice. The operations of 1915 may be performed according to the methods described herein. In some examples, aspects of the operations of 1915 may be performed by a session manager as described with reference to FIGS. 9 through 12.

At 1920, the UE may receive, from the first network entity or the second network entity, a second control message indicating that the session is rejected. The operations of 1920 may be performed according to the methods described herein. In some examples, aspects of the operations of 1920 may be performed by a session manager as described with reference to FIGS. 9 through 12.

At 1925, the UE may identify, in the second control message, at least one condition for retrying to establish the session via the network slice. The operations of 1925 may be performed according to the methods described herein. In some examples, aspects of the operations of 1925 may be performed by a session condition manager as described with reference to FIGS. 9 through 12.

Figure 20:
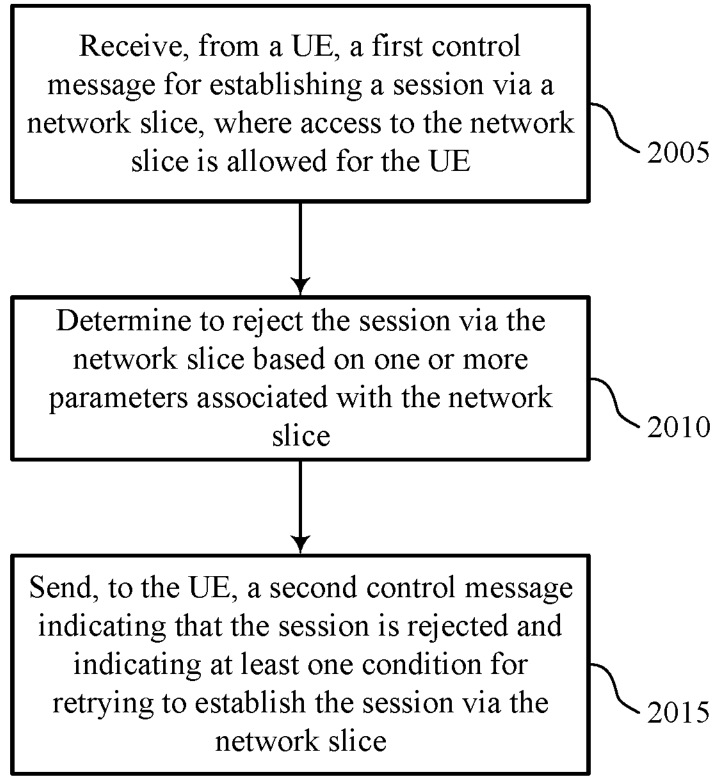

FIG. 20 shows a flowchart illustrating a method 2000 that supports handling slice limitations in accordance with aspects of the present disclosure. The operations of method 2000 may be implemented by a network entity or its components as described herein. For example, the operations of method 2000 may be performed by a communications manager as described with reference to FIGS. 13 through 16. In some examples, a network entity may execute a set of instructions to control the functional elements of the network entity to perform the functions described below. Additionally, or alternatively, a network entity may perform aspects of the functions described below using special-purpose hardware.

At 2005, the network entity may receive, from a UE, a first control message for establishing a session via a network slice, where access to the network slice is allowed for the UE. The operations of 2005 may be performed according to the methods described herein. In some examples, aspects of the operations of 2005 may be performed by a session manager as described with reference to FIGS. 13 through 16.

At 2010, the network entity may determine to reject the session via the network slice based on one or more parameters associated with the network slice. The operations of 2010 may be performed according to the methods described herein. In some examples, aspects of the operations of 2010 may be performed by a GST parameter manager as described with reference to FIGS. 13 through 16.

At 2015, the network entity may send, to the UE, a second control message indicating that the session is rejected and indicating at least one condition for retrying to establish the session via the network slice. The operations of 2015 may be performed according to the methods described herein. In some examples, aspects of the operations of 2015 may be performed by a session manager as described with reference to FIGS. 13 through 16.

Figure 21:
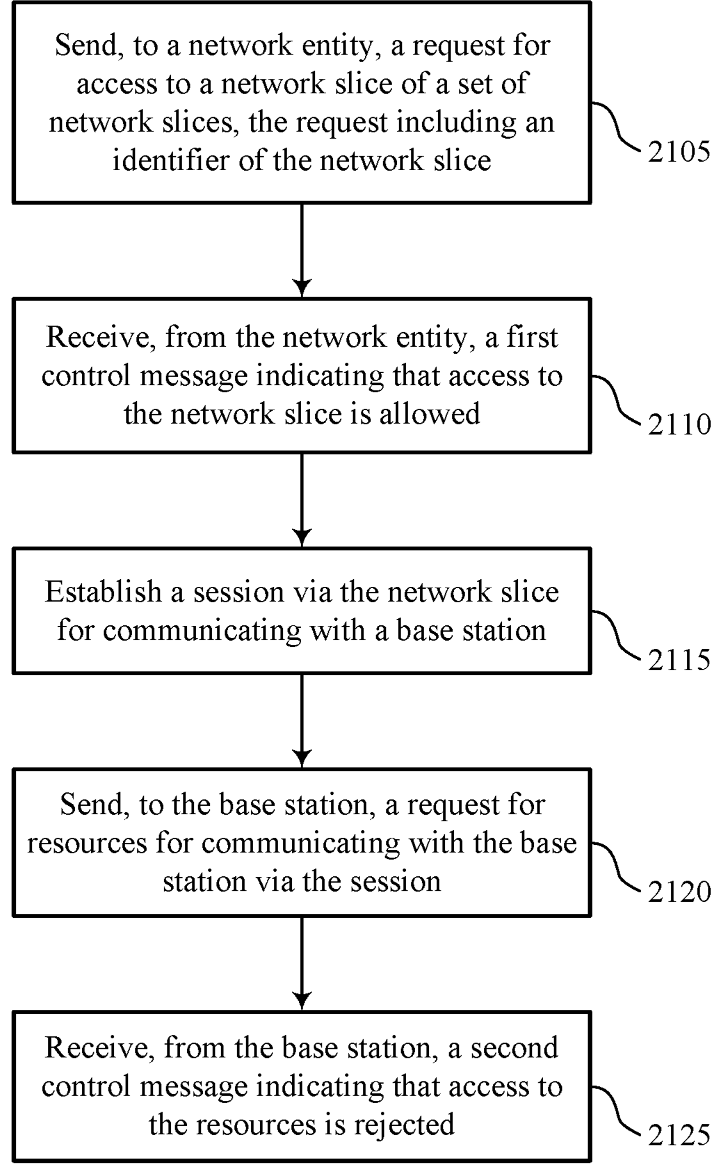

FIG. 21 shows a flowchart illustrating a method 2100 that supports handling slice limitations in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 2105, the UE may send, to a network entity, a request for access to a network slice of a set of network slices, the request including an identifier of the network slice. The operations of 2105 may be performed according to the methods described herein. In some examples, aspects of the operations of 2105 may be performed by a requested NSSAI manager as described with reference to FIGS. 9 through 12.

At 2110, the UE may receive, from the network entity, a first control message indicating that access to the network slice is allowed. The operations of 2110 may be performed according to the methods described herein. In some examples, aspects of the operations of 2110 may be performed by an allowed NSSAI manager as described with reference to FIGS. 9 through 12.

At 2115, the UE may establish a session via the network slice for communicating with a base station. The operations of 2115 may be performed according to the methods described herein. In some examples, aspects of the operations of 2115 may be performed by a session manager as described with reference to FIGS. 9 through 12.

At 2120, the UE may send, to the base station, a request for resources for communicating with the base station via the session. The operations of 2120 may be performed according to the methods described herein. In some examples, aspects of the operations of 2120 may be performed by a resource manager as described with reference to FIGS. 9 through 12.

At 2125, the UE may receive, from the base station, a second control message indicating that access to the resources is rejected. The operations of 2125 may be performed according to the methods described herein. In some examples, aspects of the operations of 2125 may be performed by a resource manager as described with reference to FIGS. 9 through 12.

Figure 22:
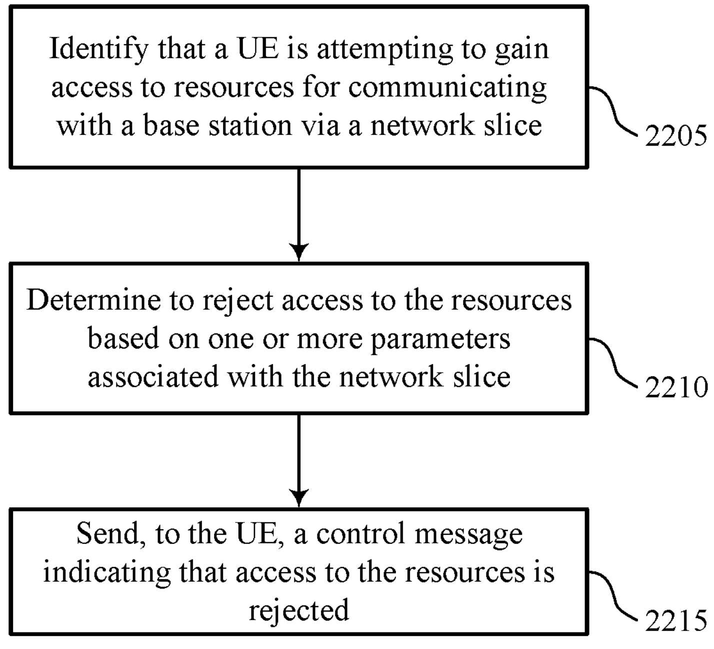

FIG. 22 shows a flowchart illustrating a method 2200 that supports handling slice limitations in accordance with aspects of the present disclosure. The operations of method 2200 may be implemented by a network entity or its components as described herein. For example, the operations of method 2200 may be performed by a communications manager as described with reference to FIGS. 13 through 16. In some examples, a network entity may execute a set of instructions to control the functional elements of the network entity to perform the functions described below. Additionally, or alternatively, a network entity may perform aspects of the functions described below using special-purpose hardware.

At 2205, the network entity may identify that a UE is attempting to gain access to resources for communicating with a base station via a network slice. The operations of 2205 may be performed according to the methods described herein. In some examples, aspects of the operations of 2205 may be performed by a resource manager as described with reference to FIGS. 13 through 16.

At 2210, the network entity may determine to reject access to the resources based on one or more parameters associated with the network slice. The operations of 2210 may be performed according to the methods described herein. In some examples, aspects of the operations of 2210 may be performed by a GST parameter manager as described with reference to FIGS. 13 through 16.

At 2215, the network entity may send, to the UE, a control message indicating that access to the resources is rejected. The operations of 2215 may be performed according to the methods described herein. In some examples, aspects of the operations of 2215 may be performed by a resource manager as described with reference to FIGS. 13 through 16.

Figure 23:
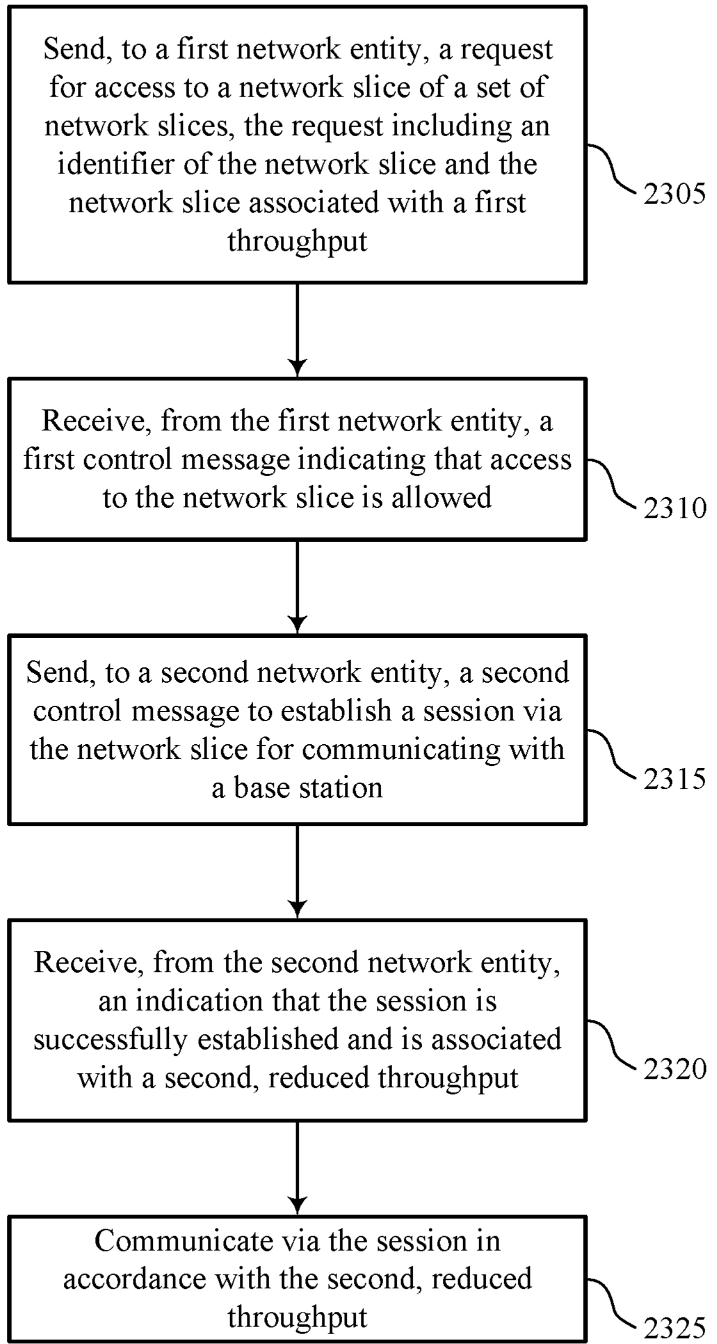

FIG. 23 shows a flowchart illustrating a method 2300 that supports handling slice limitations in accordance with aspects of the present disclosure. The operations of method 2300 may be implemented by a UE 115 or its components as described herein. For example, the operations of method 2300 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 2305, the UE may send, to a first network entity, a request for access to a network slice of a set of network slices, the request including an identifier of the network slice and the network slice associated with a first throughput. The operations of 2305 may be performed according to the methods described herein. In some examples, aspects of the operations of 2305 may be performed by a requested NSSAI manager as described with reference to FIGS. 9 through 12.

At 2310, the UE may receive, from the first network entity, a first control message indicating that access to the network slice is allowed. The operations of 2310 may be performed according to the methods described herein. In some examples, aspects of the operations of 2310 may be performed by an allowed NSSAI manager as described with reference to FIGS. 9 through 12.

At 2315, the UE may send, to a second network entity, a second control message to establish a session via the network slice for communicating with a base station. The operations of 2315 may be performed according to the methods described herein. In some examples, aspects of the operations of 2315 may be performed by a session manager as described with reference to FIGS. 9 through 12.

At 2320, the UE may receive, from the second network entity, an indication that the session is successfully established and is associated with a second, reduced throughput. The operations of 2320 may be performed according to the methods described herein. In some examples, aspects of the operations of 2320 may be performed by a session manager as described with reference to FIGS. 9 through 12.

At 2325, the UE may communicate via the session in accordance with the second, reduced throughput. The operations of 2325 may be performed according to the methods described herein. In some examples, aspects of the operations of 2325 may be performed by a session manager as described with reference to FIGS. 9 through 12.

Figure 24:
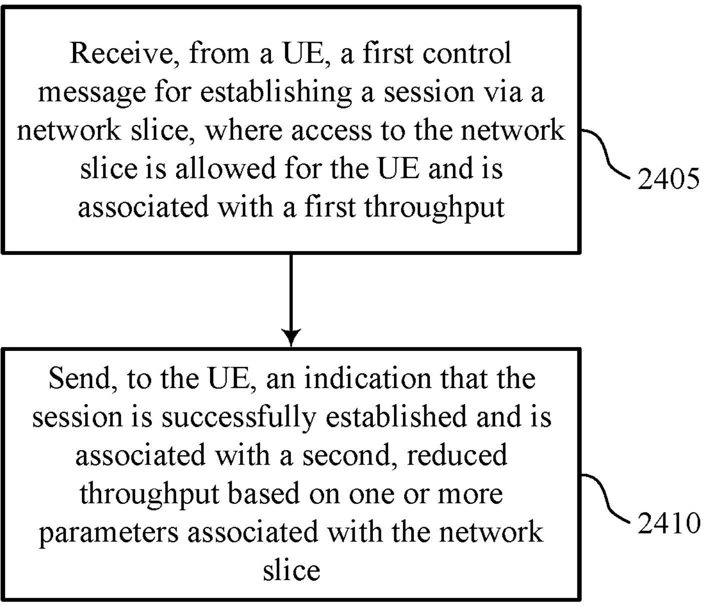

FIG. 24 shows a flowchart illustrating a method 2400 that supports handling slice limitations in accordance with aspects of the present disclosure. The operations of method 2400 may be implemented by a network entity or its components as described herein. For example, the operations of method 2400 may be performed by a communications manager as described with reference to FIGS. 13 through 16. In some examples, a network entity may execute a set of instructions to control the functional elements of the network entity to perform the functions described below. Additionally, or alternatively, a network entity may perform aspects of the functions described below using special-purpose hardware.

At 2405, the network entity may receive, from a UE, a first control message for establishing a session via a network slice, where access to the network slice is allowed for the UE and is associated with a first throughput. The operations of 2405 may be performed according to the methods described herein. In some examples, aspects of the operations of 2405 may be performed by a session manager as described with reference to FIGS. 13 through 16.

At 2410, the network entity may send, to the UE, an indication that the session is successfully established and is associated with a second, reduced throughput based on one or more parameters associated with the network slice. The operations of 2410 may be performed according to the methods described herein. In some examples, aspects of the operations of 2410 may be performed by a session manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The Following Provides an Overview of Aspects of the Present Disclosure:

Aspect 1: A method for wireless communication at a UE, comprising: sending, to a network entity, a first request for access to a network slice of a plurality of network slices, the first request comprising an identifier of the network slice; receiving, from the network entity, a first control message indicating that access to the network slice is rejected and indicating at least one condition for retrying to access the network slice; and determining whether to send a second request for access to the network slice based at least in part on the at least one condition for retrying to access the network slice.

Aspect 2: The method of aspect 1, further comprising: determining that the at least one condition for retrying to access the network slice is satisfied; sending, to the network entity, the second request for access to the network slice; and receiving, from the network entity, a second control message indicating that access to the network slice is allowed.

Aspect 3: The method of aspects 1 and 2, wherein the at least one condition comprises whether the UE is within a geographic coverage area for the network slice.

Aspect 4: The method of aspects 1 through 3, wherein the at least one condition comprises whether a backoff timer associated with the network slice has expired.

Aspect 5: The method of aspects 1 through 4, wherein the at least one condition comprises whether a session or application type has changed.

Aspect 6: A method for wireless communication at a UE, comprising: sending, to a first network entity, a request for access to a network slice of a plurality of network slices, the request comprising an identifier of the network slice; receiving, from the first network entity, a control message indicating that access to the network slice is allowed; sending, to a second network entity, a first control message to establish a session via the network slice; receiving, from the first network entity or the second network entity, a second control message indicating that the session is rejected; and identifying, in the second control message, at least one condition for retrying to establish the session via the network slice.

Aspect 7: The method of aspect 6, further comprising: determining that the at least one condition for retrying to establish the session via the network slice is satisfied; sending, to the second network entity, a third control message to establish the session via the network slice; and receiving, from the second network entity, an indication that the session via the network slice is successfully established.

Aspect 8: The method of aspects 6 and 7, wherein the at least one condition comprises whether the UE is within a geographic coverage area for the network slice.

Aspect 9: The method of aspects 6 through 8, wherein the at least one condition comprises whether a session or application type has changed.

Aspect 10: The method of aspects 6 through 9, wherein the at least one condition comprises whether an SSC mode has changed.

Aspect 11: The method of aspects 6 through 10, further comprising: identifying, in the second control message, a rejection cause for the session being rejected.

Aspect 12: The method of aspects 6 through 11, wherein the rejection cause indicates that an SSC mode is unsupported.

Aspect 13: The method of aspects 6 through 12, wherein the first network entity comprises an access and mobility management function, and the second network entity comprises a session management function.

Aspect 14: A method for wireless communication at a network entity, comprising: receiving, from a user equipment (UE), a first request for access to a network slice of a plurality of network slices, the first request comprising an identifier of the network slice; determining to reject access to the network slice based at least in part on one or more parameters associated with the network slice; and sending, to the UE, a first control message indicating that access to the network slice is rejected and indicating at least one condition for retrying to access the network slice.

Aspect 15: The method of aspect 14, further comprising: receiving, from the UE, a second request for access to the network slice based at least in part on the at least one condition for retrying to access the network slice, the second request comprising an the identifier of the network slice; determining to allow access to the network slice based at least in part on the one or more parameters associated with the network slice; and sending, to the UE, a second control message indicating that access to the network slice is allowed.

Aspect 16: The method of aspects 14 and 15, further comprising: storing at least one criterion used to determine to reject access to the network slice based at least in part on the one or more parameters associated with the network slice or based at least in part on other parameters associated with the network slice; determining that the at least one criterion used to determine to reject access to the network slice is invalid; and sending, to the UE, a second control message indicating that access to the network slice is allowed.

Aspect 17: The method of aspects 14 through 16, wherein the at least one condition comprises whether the UE is within a geographic coverage area for the network slice.

Aspect 18: The method of aspects 14 through 17, wherein the at least one condition comprises whether a backoff timer associated with the network slice has expired.

Aspect 19: The method of aspects 14 through 18, wherein the at least one condition comprises whether a session or application type has changed.

Aspect 20: The method of aspects 14 through 19, wherein the one or more parameters comprise generic network slice template parameters.

Aspect 21: A method for wireless communication at a network entity, comprising: receiving, from a user equipment (UE), a first control message for establishing a session via a network slice, wherein access to the network slice is allowed for the UE; determining to reject the session via the network slice based at least in part on one or more parameters associated with the network slice; and sending, to the UE, a second control message indicating that the session is rejected and indicating at least one condition for retrying to establish the session via the network slice.

Aspect 22: The method of aspect 21, wherein the network entity comprises an AMF, the method further comprising: receiving, from the UE, a request for access to the network slice of a plurality of network slices, the request comprising an identifier of the network slice; determining that at least one criterion of the one or more parameters associated with the network slice is not satisfied; sending, to the UE, a third control message indicating that access to the network slice is allowed; and storing the at least one criterion to use to determine to reject the session via the network slice based at least in part on determining that the at least one criterion of the one or more parameters associated with the network slice is not satisfied.

Aspect 23: The method of aspects 21 and 22, further comprising: receiving, from the UE, a third control message for establishing the session via the network slice based at least in part on the at least one condition for retrying to establish the session via the network slice; determining to allow the session via the network slice based at least in part on the one or more parameters associated with the network slice; and sending, to the UE, an indication that the session via the network slice is successfully established.

Aspect 24: The method of aspects 21 through 23, wherein the at least one condition comprises whether the UE is within a geographic coverage area for the network slice.

Aspect 25: The method of aspects 21 through 24, wherein the at least one condition comprises whether a session or application type has changed.

Aspect 26: The method of aspects 21 through 25, wherein the at least one condition comprises whether an SSC mode has changed.

Aspect 27: The method of aspects 21 through 26, wherein sending the second control message comprises: sending, in the second control message, a rejection cause for the session being rejected.

Aspect 28: The method of aspects 21 through 27, wherein the rejection cause indicates that an SSC mode is unsupported.

Aspect 29: An apparatus for wireless communication at a UE, comprising a processor; memory coupled with the processor; and instructions stored in the memory and executable by the processor to cause the apparatus to perform a method of any of aspects 1 through 5.

Aspect 30: An apparatus for wireless communication at a UE, comprising at least one means for performing a method of any of aspects 1 through 5.

Aspect 31: A non-transitory computer-readable medium storing code for wireless communication at a UE, the code comprising instructions executable by a processor to perform a method of any of aspects 1 through 5.

Aspect 32: An apparatus for wireless communication at a UE, comprising a processor; memory coupled with the processor; and instructions stored in the memory and executable by the processor to cause the apparatus to perform a method of any of aspects 6 through 13.

Aspect 33: An apparatus for wireless communication at a UE, comprising at least one means for performing a method of any of aspects 6 through 13.

Aspect 34: A non-transitory computer-readable medium storing code for wireless communication at a UE, the code comprising instructions executable by a processor to perform a method of any of aspects 6 through 13.

Aspect 35: An apparatus for wireless communication at a network entity, comprising a processor; memory coupled with the processor; and instructions stored in the memory and executable by the processor to cause the apparatus to perform a method of any of aspects 14 through 20.

Aspect 36: An apparatus for wireless communication at a network entity, comprising at least one means for performing a method of any of aspects 14 through 20.

Aspect 37: A non-transitory computer-readable medium storing code for wireless communication at a network entity, the code comprising instructions executable by a processor to perform a method of any of aspects 14 through 20.

Aspect 38: An apparatus for wireless communication at a network entity, comprising a processor; memory coupled with the processor; and instructions stored in the memory and executable by the processor to cause the apparatus to perform a method of any of aspects 21 through 28.

Aspect 39: An apparatus for wireless communication at a network entity, comprising at least one means for performing a method of any of aspects 21 through 28.

Aspect 40: A non-transitory computer-readable medium storing code for wireless communication at a network entity, the code comprising instructions executable by a processor to perform a method of any of aspects 21 through 28.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV- DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended FIGURES, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:

one or more memories storing processor-executable code; and one or more processors coupled with the one or more memories and individually or collectively operable to execute the code to cause the UE to:

send, to a network entity, a first request for access to a network slice of a plurality of network slices, the first request comprising an identifier of the network slice;

receive, in a first control message from the network entity, an indication of a cause for rejecting access to the network slice; and receive, in the first control message, one or more single network slice selection assistance information (S-NSSAI) values and one or more tracking area identity values associated with the one or more S-NSSAI values, wherein the one or more tracking area identity values correspond to a second geographic coverage area where access to the network slice is allowed based at least in part on a UE route selection policy (URSP), and wherein the second geographic coverage area is different from a first geographic coverage area where access to the network slice is rejected.

2. The apparatus of claim 1, wherein the second geographic coverage area is a portion of the first geographic coverage area.

3. The apparatus of claim 1, wherein the one or more processors are individually or collectively further operable to execute the code to cause the UE to:

send, to the network entity, a second request for access to the network slice based at least in part on a satisfaction of at least one condition for retrying to access the network slice; and receive, from the network entity, a second control message indicating that access to the network slice is allowed.

4. The apparatus of claim 3, wherein the at least one condition comprises whether a backoff timer associated with the network slice has expired.

5. The apparatus of claim 3, wherein the at least one condition comprises whether the UE is within the second geographic coverage area for the network slice.

6. The apparatus of claim 1, wherein the cause for rejecting access to the network slice comprises an indication that a session and service continuity (SSC) mode is unsupported.

7. The apparatus of claim 1, wherein the cause for rejecting access to the network slice comprises an indication that a maximum quantity of protocol data unit (PDU) sessions for the network slice is reached.

8. A method for wireless communication at a user equipment (UE), comprising:

sending, to a network entity, a first request for access to a network slice of a plurality of network slices, the first request comprising an identifier of the network slice;

receiving, in a first control message from the network entity, an indication of a cause for rejecting access to the network slice; and receiving, in the first control message, one or more single network slice selection assistance information (S-NSSAI) values and one or more tracking area identity values associated with the one or more S-NSSAI values, wherein the one or more tracking area identity values correspond to a second geographic coverage area where access to the network slice is allowed based at least in part on a UE route selection policy (URSP), and wherein the second geographic coverage area is different from a first geographic coverage area where access to the network slice is rejected.

9. The method of claim 8, wherein the second geographic coverage area is a portion of the first geographic coverage area.

10. The method of claim 8, further comprising:

sending, to the network entity, a second request for access to the network slice based at least in part on a satisfaction of at least one condition for retrying to access the network slice; and receiving, from the network entity, a second control message indicating that access to the network slice is allowed.

11. The method of claim 10, wherein the at least one condition comprises whether a backoff timer associated with the network slice has expired.

12. The method of claim 10, wherein the at least one condition comprises whether the UE is within the second geographic coverage area for the network slice.

13. The method of claim 8, wherein the cause for rejecting access to the network slice comprises an indication that a session and service continuity (SSC) mode is unsupported.

14. The method of claim 8, wherein the cause for rejecting access to the network slice comprises an indication that a maximum quantity of protocol data unit (PDU) sessions for the network slice is reached.

15. A non-transitory computer-readable medium storing code for wireless communications, the code comprising instructions executable by one or more processors to:

send, to a network entity, a first request for access to a network slice of a plurality of network slices, the first request comprising an identifier of the network slice;

receive, in a first control message from the network entity, an indication of a cause for rejecting access to the network slice; and receive, in the first control message, one or more single network slice selection assistance information (S-NSSAI) values and one or more tracking area identity values associated with the one or more S-NSSAI values, wherein the one or more tracking area identity values correspond to a second geographic coverage area where access to the network slice is allowed based at least in part on a user equipment (UE) route selection policy (URSP), and wherein the second geographic coverage area is different from a first geographic coverage area where access to the network slice is rejected.

16. The non-transitory computer-readable medium of claim 15, wherein the second geographic coverage area is a portion of the first geographic coverage area.

17. The non-transitory computer-readable medium of claim 15, wherein the instructions are further executable by the one or more processors to:

send, to the network entity, a second request for access to the network slice based at least in part on a satisfaction of at least one condition for retrying to access the network slice; and receive, from the network entity, a second control message indicating that access to the network slice is allowed.

18. The non-transitory computer-readable medium of claim 17, wherein the at least one condition comprises whether a backoff timer associated with the network slice has expired.

19. The non-transitory computer-readable medium of claim 17, wherein the at least one condition comprises whether a user equipment (UE) is within the second geographic coverage area for the network slice.

20. The non-transitory computer-readable medium of claim 15, wherein the cause for rejecting access to the network slice comprises an indication that a session and service continuity (SSC) mode is unsupported.

* * * * *